(12) United States Patent
Pries et al.

(10) Patent No.: US 12,249,846 B2
(45) Date of Patent: Mar. 11, 2025

(54) POLYPHASE WIRELESS POWER TRANSFER SYSTEMS, COIL ASSEMBLIES AND RESONANT NETWORKS

(71) Applicant: UT-Battelle, LLC, Oak Ridge, TN (US)

(72) Inventors: Jason L. Pries, Oak Ridge, TN (US); Veda Prakash Galigekere, Oak Ridge, TN (US); Gui-Jia Su, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/608,323

(22) Filed: Mar. 18, 2024

(65) Prior Publication Data
US 2024/0258831 A1    Aug. 1, 2024

Related U.S. Application Data

(63) Continuation of application No. 17/420,486, filed as application No. PCT/US2020/012074 on Jan. 2, 2020, now Pat. No. 11,936,199.
(Continued)

(51) Int. Cl.
*H02J 50/12* (2016.01)
*H01F 27/38* (2006.01)
*H01F 38/14* (2006.01)

(52) U.S. Cl.
CPC .............. *H02J 50/12* (2016.02); *H01F 38/14* (2013.01); *H01F 27/38* (2013.01)

(58) Field of Classification Search
CPC ........... H02J 50/12; H02J 50/80; H01F 38/14; H01F 27/38; H01F 27/36; B60L 53/12
See application file for complete search history.

(56) References Cited

U.S. PATENT DOCUMENTS 2,925,540 A * 2/1960 Cox ................. H01H 51/30
                                             335/282
9,441,603 B2 * 9/2016 Khan .................. B60L 53/36
(Continued)

FOREIGN PATENT DOCUMENTS

EP    2765683 A1    8/2014
EP    3282459 A1    2/2018
(Continued)

OTHER PUBLICATIONS

Howell, D. et al., "Enabling Fast Charging: A Technology Gap Assessment", US Department of Energy, Oct. 2017, pp. 1-83.
(Continued)

*Primary Examiner* — Jared Fureman
*Assistant Examiner* — Michael J Warmflash
(74) *Attorney, Agent, or Firm* — Scully, Scott, Murphy & Presser, P.C.

(57) ABSTRACT

Polyphase wireless power transfer systems are provided. The transfer system may be used for charging hybrid and electric vehicles. The systems are capable of transferring over 50 KW over an air gap of 15 cm. The systems use a rotating magnetic field to transfer power. The system may comprise transmitter coil assembly. The coil assembly may be one or more layers. The system may employ either unipolar or bipolar coils. The transmitter also comprises compensating capacitance connected in series with at least one coil for each phase. A value of the compensating capacitance for each phase is determined such that the transmitter has at least two independently excitable resonant modes at a resonant frequency. The transmitter is compatible with a plurality of different receivers including three-phase, single phase with a circular coil and single phase with DD coils.

27 Claims, 29 Drawing Sheets
(10 of 29 Drawing Sheet(s) Filed in Color)

Related U.S. Application Data

(60) Provisional application No. 62/938,476, filed on Nov. 21, 2019, provisional application No. 62/787,401, filed on Jan. 2, 2019.

(56) References Cited

U.S. PATENT DOCUMENTS

| | | | | |
|---|---|---|---|---|
| 10,998,768 | B2* | 5/2021 | Choi | H02J 50/12 |
| 11,936,199 | B2* | 3/2024 | Pries | H01F 38/14 |
| 2005/0116683 | A1* | 6/2005 | Cheng | H02J 50/10 |
| | | | | 320/108 |
| 2022/0085652 | A1* | 3/2022 | Pries | H02J 50/12 |

FOREIGN PATENT DOCUMENTS

| | | |
|---|---|---|
| KR | 10-2018-0130248 A | 12/2018 |
| WO | 2010/046744 A2 | 4/2010 |
| WO | 2015/066818 A1 | 5/2015 |
| WO | 2017/023180 A1 | 2/2017 |
| WO | 2018/106124 A1 | 6/2018 |

OTHER PUBLICATIONS

Covic, G. et al., "Inductive Power Transfer", Proceedings of the IEEE, Jun. 2013, pp. 1276-1289, vol. 101, No. 6.

Covic, G. et al., "Modern Trends in Inductive Power Transfer for Transportation Applications", IEEE Journal of Emerging and Selected Topics in Power Electronics, Mar. 2013, pp. 28-41, vol. 1, No. 1.

Gao, J., "Traveling Magnetic Field for Homogeneous Wireless Power Transmission", IEEE Transactions on Power Delivery, Jan. 2007, pp. 507-514, vol. 22, No. 1.

Covic, G. et al., "A Three-Phase Inductive Power Transfer System for Roadway-Powered Vehicles", IEEE Transactions on Industrial Electronics, Dec. 2007, pp. 3370-3378, vol. 54, No. 6.

Kissin, M. et al., "Interphase Mutual Inductance in Polyphase Inductive Power Transfer Systems," IEEE Transactions on Industrial Electronics, Jul. 2009, pp. 2393-2400, vol. 56, No. 7.

Elliott, G. et al., "Multiphase Pickups for Large Lateral Tolerance Contactless Power-Transfer Systems", IEEE Transactions on Industrial Electronics, May 2010, pp. 1590-1598, vol. 57, No. 5.

Kissin, M. et al., "Steady-State Flat-Pickup Loading Effects in Polyphase Inductive Power Transfer Systems", IEEE Transactions on Industrial Electronics, Jun. 2011, pp. 2274-2282, vol. 58, No. 6.

Thrimawithana, D. et al., "A Three-Phase Bi-Directional IPT System for Contactless Charging of Electric Vehicles", 2011 IEEE International Symposium on Industrial Electronics, Jun. 2011, pp. 1957-1962.

Shin, J. et al., "Design and Implementation of Shaped Magnetic-Resonance-Based Wireless Power Transfer System for Roadway-Powered Moving Electric Vehicles", IEEE Transactions on Industrial Electronics, Mar. 2014, pp. 1179-1192, vol. 61, No. 3.

Kim, M. et al., "A Three-Phase Wireless-Power-Transfer System for Online Electric Vehicles with Reduction of Leakage Magnetic Fields", IEEE Transactions on Microwave Theory and Techniques, Nov. 2015, pp. 3806--3813, vol. 63, No. 11.

Lee, J. et al., "Design and implementation of contactless power track system with Y-shaped inductive pickup", IET Power Electronics, 2016, pp. 536--545, vol. 9, No. 3.

Iruretagoyena, U. et al., "Design and Characterization of a Meander-Type Dynamic Inductively Coupled Power Transfer Coil", IEEE Transactions on Industry Applications, Jul. 2017, pp. 3950-3959, vol. 53, No. 4.

Cui, S. et al., "Analysis and Design of Multiphase Receiver With Reduction of Output Fluctuation for EV Dynamic Wireless Charging System", IEEE Transactions on Power Electronics, May 2019, pp. 4112-4124, vol. 34, No. 5.

Li, H. et al., "Uniform Power IPT System with Three-Phase Transmitter and Bipolar Receiver for Dynamic Charging", IEEE Transactions on Power Electronics, Mar. 2019, pp. 2013-2017, vol. 34, No. 3.

Matsumoto, H. et al., "Model for a Three-Phase Contactless Power Transfer System", IEEE Transactions on Power Electronics, Sep. 2011, pp. 2676-2687, vol. 26, No. 9.

Matsumoto, H. et al., "Comparison of Characteristics on Planar Contactless Power Transfer Systems", IEEE Transactions on Power Electronics, Jun. 2012, pp. 2980-2993, vol. 27, No. 6.

Matsumoto, H. et al., "Three-Phase Lines to Single-Phase Coil Planar Contactless Power Transformer", IEEE Transactions on Industrial Electronics, Apr. 2018, pp. 2904-2914, vol. 65, No. 4.

Matsumoto, H. et al., "Trifoliate Three-Phase Contactless Power Transformer in Case of Winding-Alignment", IEEE Transactions on Industrial Electronics, Jan. 2014, pp. 53-62, vol. 61, No. 1.

Matsumoto, H. et al., "Proposal and verification of two-layer three-phase contactless power transformer," IEEJ Transactions on Industry Applications, vol. 135, No. 5, pp. 539-547, 2015.

Kim, S. et al., "Tripolar Pad for Inductive Power Transfer Systems for EV Charging", IEEE Transactions on Power Electronics, Jul. 2017, pp. 5045-5057, vol. 32, No. 7.

Kim, S. et al., "Comparison of Tripolar and Circular Pads for IPT Charging Systems", IEEE Transactions on Power Electronics, Jul. 2018, pp. 6093-6103, vol. 33, No. 7.

Shiihara, Y. et al., "Three-phase Contactless Power Transformer With Magnet Yoke", 2016 19th International Conference on Electrical Machines and Systems (ICEMS), Nov. 2016, pp. 1-4.

Thrimawithana, D. et al., "Magnetic Modeling of a High-Power Three Phase Bi-Directional IPT System", IECON 2011—37th Annual Conference of the IEEE Industrial Electronics Society, Nov. 2011, pp. 1414-1419.

Song, Y. et al., "Cross Coupling Effects of Poly-phase Bi-directional Inductive Power Transfer Systems used for EV Charging", 2015 IEEE 2nd International Future Energy Electronics Conference (IFEEC), Nov. 2015, pp. 1-7.

Song, Y. et al., "LCL and CL compensations for wireless three phase Bi-directional EV charging systems", 2016 IEEE 2nd Annual Southern Power Electronics Conference (SPEC), Dec. 2016, pp. 1-6.

Song, C. et al., "Three-Phase Magnetic Field Design for Low EMI and EMF Automated Resonant Wireless Power Transfer Charger for UAV", 2015 IEEE Wireless Power Transfer Conference (WPTC), May 2015, pp. 1-4.

Kan, T. et al., "Design and Analysis of a Three-Phase Wireless Charging System for Lightweight Autonomous Underwater Vehicles", IEEE Transactions on Power Electronics, Aug. 2018, pp. 6622-6632, vol. 33, No. 8.

Song, C. et al., "EMI Reduction Methods in Wireless Power Transfer System for Drone Electrical Charger Using Tightly Coupled Three-Phase Resonant Magnetic Field", IEEE Transactions on Industrial Electronics, Sep. 2018, pp. 6839-6849, vol. 65, No. 9.

Kan, T. et al., "A Rotation Resilient Wireless Charging System for Lightweight Autonomous Underwater Vehicles," IEEE Transactions on Vehicular Technology, Aug. 2018, pp. 6935-6942, vol. 67, No. 8.

Abdolkhani, A. et al., "Through-hole Contactless Slipring System Based on Rotating Magnetic Field for Rotary Applications", IEEE Transactions on Industry Applications, Nov. 2014, pp. 3644-3655, vol. 50, No. 6.

Abdolkhani, A. et al., "A Contactless Slipring System Based on Axially Traveling Magnetic Field", IEEE Journal of Emerging and Selected Topics in Power Electronics, Mar. 2015, pp. 280-287, vol. 3, No. 1.

Ng, W. et al., "Two- and Three-Dimensional Omnidirectional Wireless Power Transfer", IEEE Transactions on Power Electronics, Sep. 2014, pp. 4470-4474, vol. 29, No. 9.

Lee, B. et al., "Three-Phase Time-Multiplexed Planar Power Transmission to Distributed Implants", IEEE Journal of Emerging and Selected Topics in Power Electronics, Mar. 2016, pp. 263-272, vol. 4, No. 1.

Lin, D. et al., "Mathematical Analysis of Omnidirectional Wireless Power Transfer—Part-I: Two-Dimensional Systems," IEEE Transactions on Power Electronics, Jan. 2017, pp. 625-633, vol. 32, No. 1.

(56) References Cited

OTHER PUBLICATIONS

Lin, D. et al., "Mathematic Analysis of Omnidirectional Wireless Power Transfer—Part-II Three-Dimensional Systems", IEEE Transactions on Power Electronics, Jan. 2017, pp. 613-624, vol. 32, No. 1.

Lee, E. et al., "Six Degrees of Freedom Wide-Range Ubiquitous IPT for IoT by DQ Magnetic Field", IEEE Transactions on Power Electronics, Nov. 2017, pp. 8258-8276, vol. 32, No. 11.

Choi, B. et al., "Six Degrees of Freedom Mobile Inductive Power Transfer by Crossed Dipole Tx and Rx Coils", IEEE Transactions on Power Electronics, Apr. 2016, pp. 3252-3272, vol. 31, No. 4.

Safaee, A. et al., "Reactive Power Compensation in Three Phase High Output Inductive Power Transfer", 2015 IEEE Electrical Power and Energy Conference (EPEC), Oct. 2015, pp. 375-380.

Safaee, A. et al., "Reactive Power Compensation Scheme for an Imbalanced Three-Phase Series-Compensated Wireless Power Transfer System with a Star-Connected Load", 2018 IEEE Transportation Electrification Conference and Expo (JTEC), Jun. 2018, pp. 44-48.

Zhang, F., "The Schur Complement and Its Applications", Mar. 2005, pp. 1-308.

Luo, B. et al., "Analysis and Designed of Three-Phase Capacitive Coupled Wireless Power Transfer for High Power Charging System," APEC, 2018, pp. 1369-1374.

Pries, J. et al., "Coil Power Density Optimization and Trade-off Study for a 1 00KW Electric Vehicle IPT Wireless Charging System", 2018 IEEE Energy Conversion Congress and Exposition (ECCE), 2018, pp. 1196-1201.

Kurs, A. et al., "Wireless Power Transfer via Strongly Coupled Magnetic Resonances", Science, Jul. 6, 2007, pp. 83-86, vol. 317, No. 5834.

Musavi, F. et al., "Overview of wireless power transfer technologies for electric vehicle battery charging", IET Power Electronics, Jan. 2014, pp. 60-66, vol. 7, No. 1.

Choi, S. et al., "Advances in Wireless Power Transfer Systems for Roadway-Powered Electric Vehicles", IEEE Journal of Emerging and Selected Topics in Power Electronics, Mar. 2015, pp. 18-36, vol. 3, No. 1.

Musavi, F. et al., "Wireless Power Transfer: A Survey of EV Battery Charging Technologies", 2012 IEEE Energy Conversion Congress and Exposition (ECCE), Sep. 2012, pp. 1804-1810.

Li, S. et al., "Wireless Power Transfer for Electric Vehicle Applications", IEEE Journal of Emerging and Selected Topics in Power Electronics, Mar. 2015, pp. 4-17, vol. 3, No. 1.

"US now has over 20,000 electric car charging stations with more than 68,800 connectors", https://electrek.co/2019/07/09/US-electric-car-chargingstation-connectors, printed Aug. 4, 2021.

"How many gas stations are there in the U.S?", https://www.fueleconomy.gov/feg/quizzes/answerQuiz16.shtml, printed Aug. 4, 2021.

Galigekere, V. et al., "120 KW High-Power Wireless Charging System Development", https://resourcecenter.tec.ieee.org/webinar-slides/TECWEB0090.html, printed Aug. 4, 2021.

International Search report and Written Opinion dated Jul. 1, 2020 received in International Application No. PCT/US2020/012074.

Office Action dated Oct. 12, 2023 received in Canadian Patent Application No. CA 3,125,006.

* cited by examiner

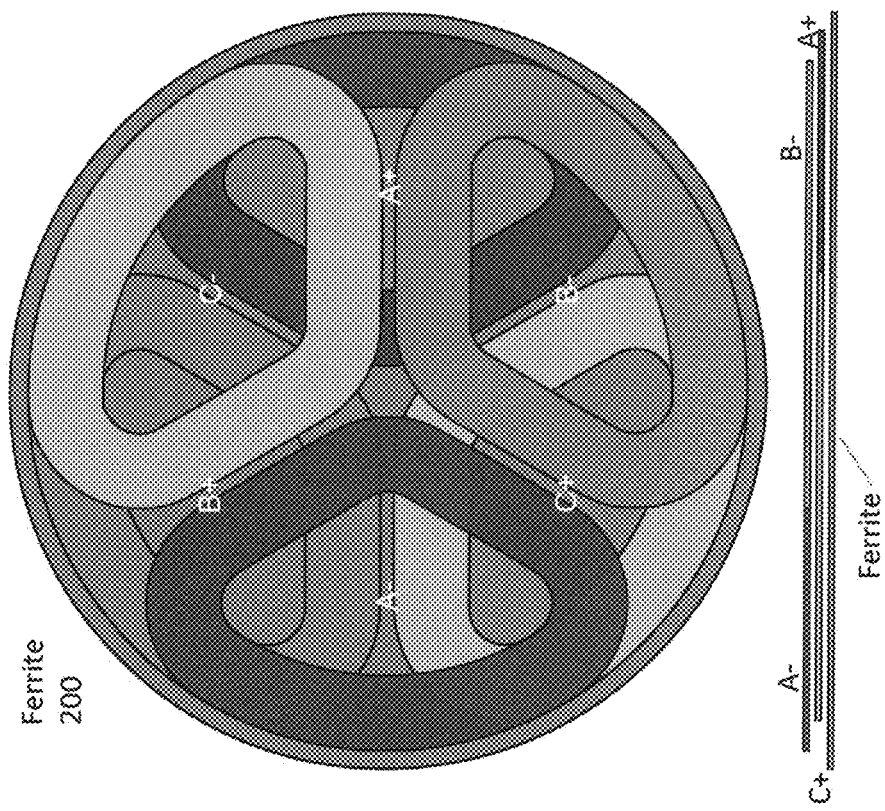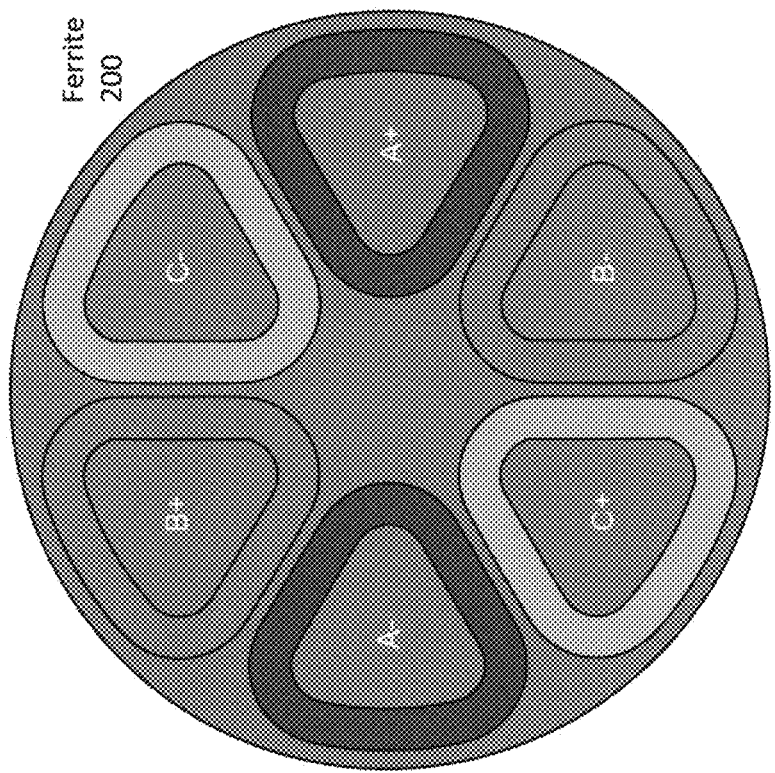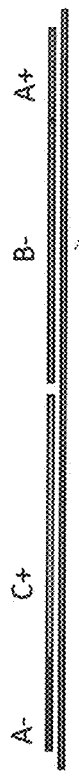

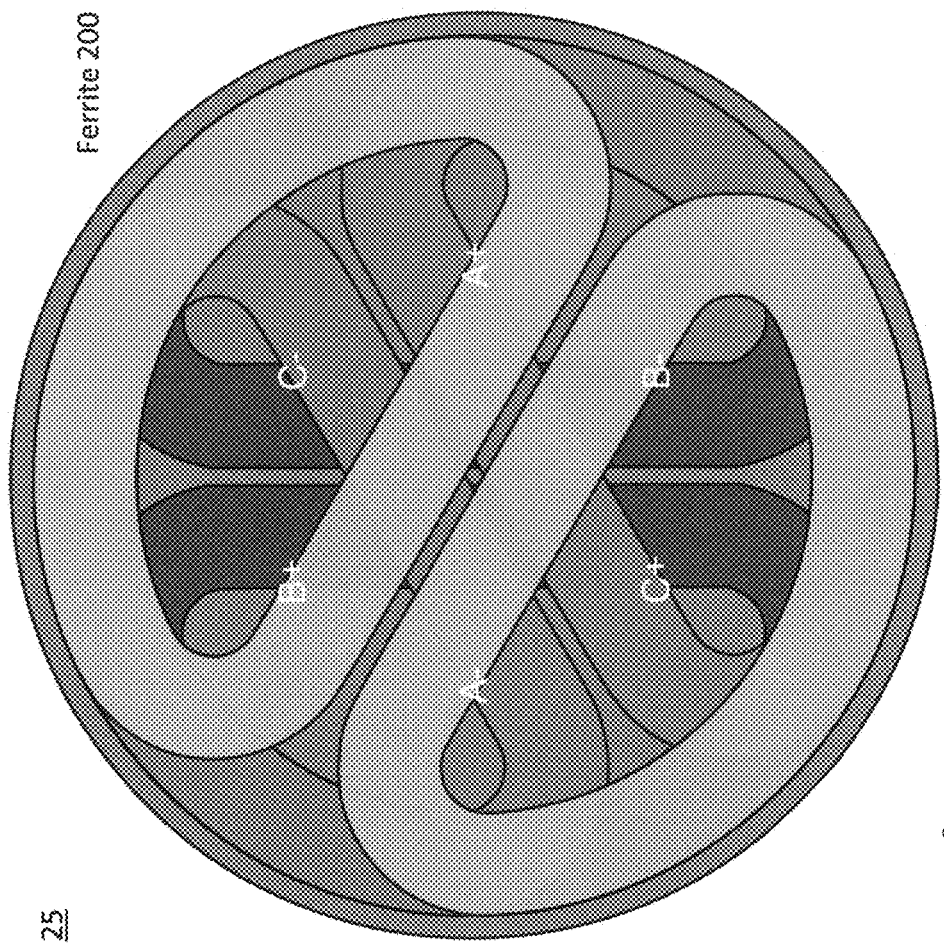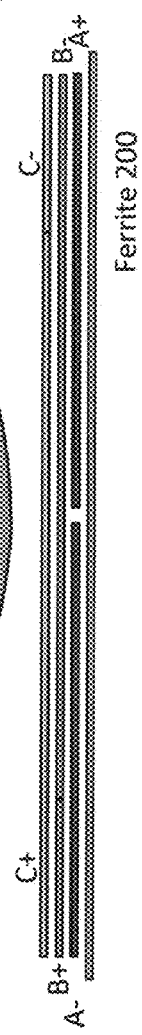
Fig. 4A
Fig. 4B

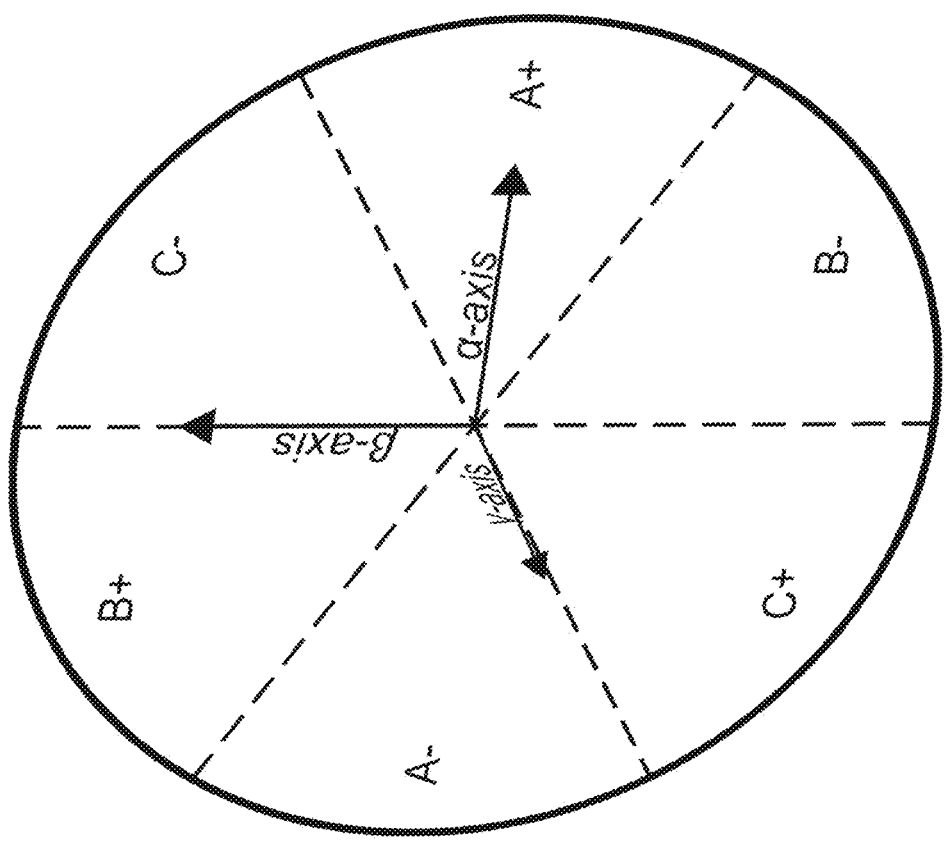

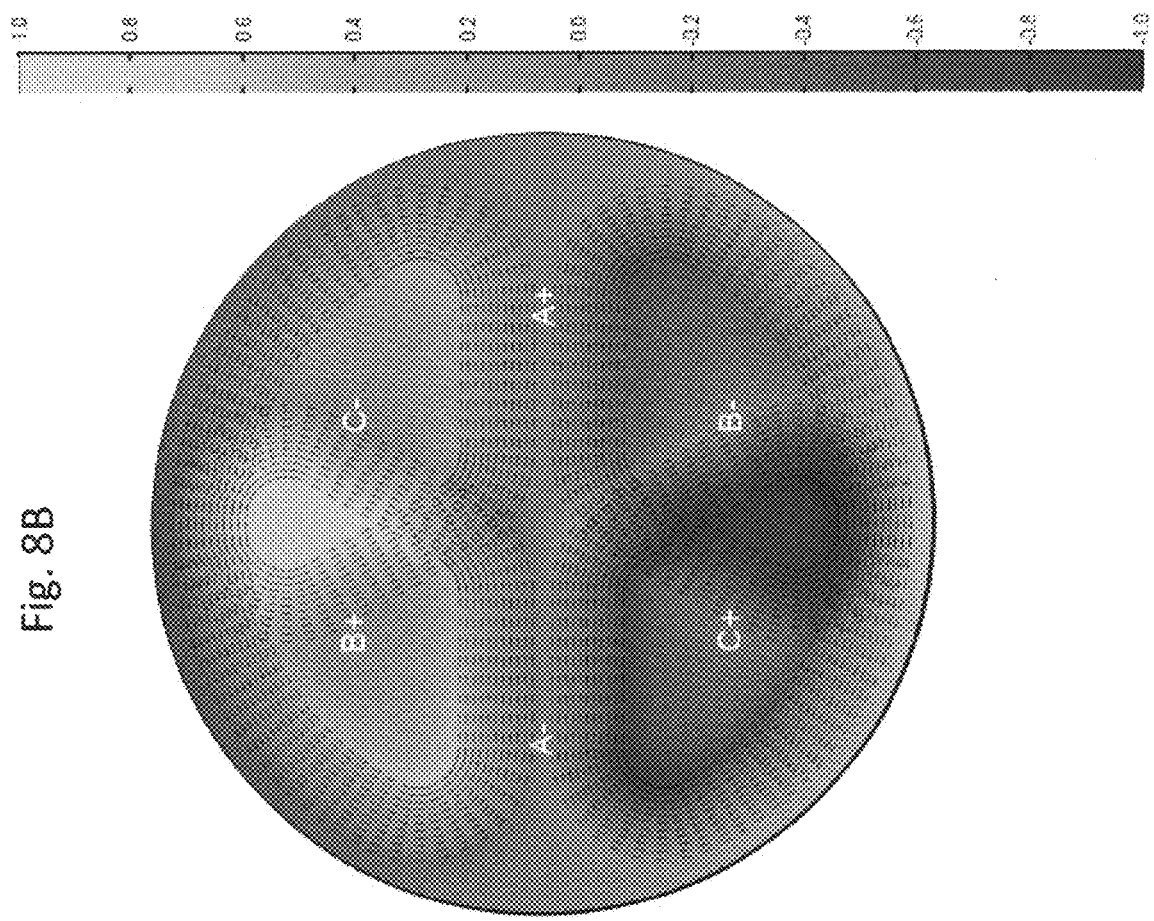
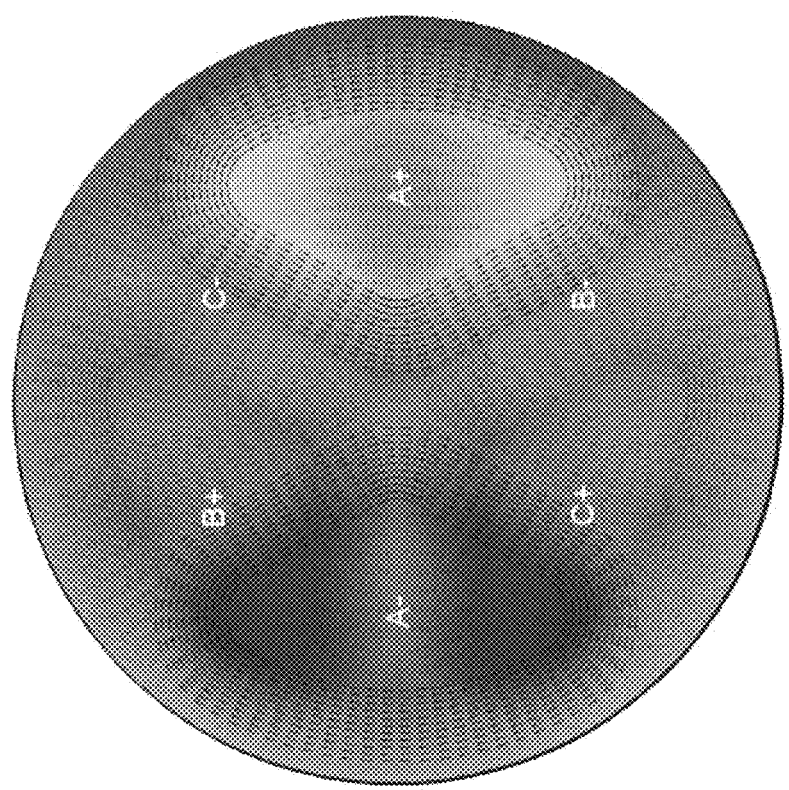
Fig. 8B
Fig. 8A

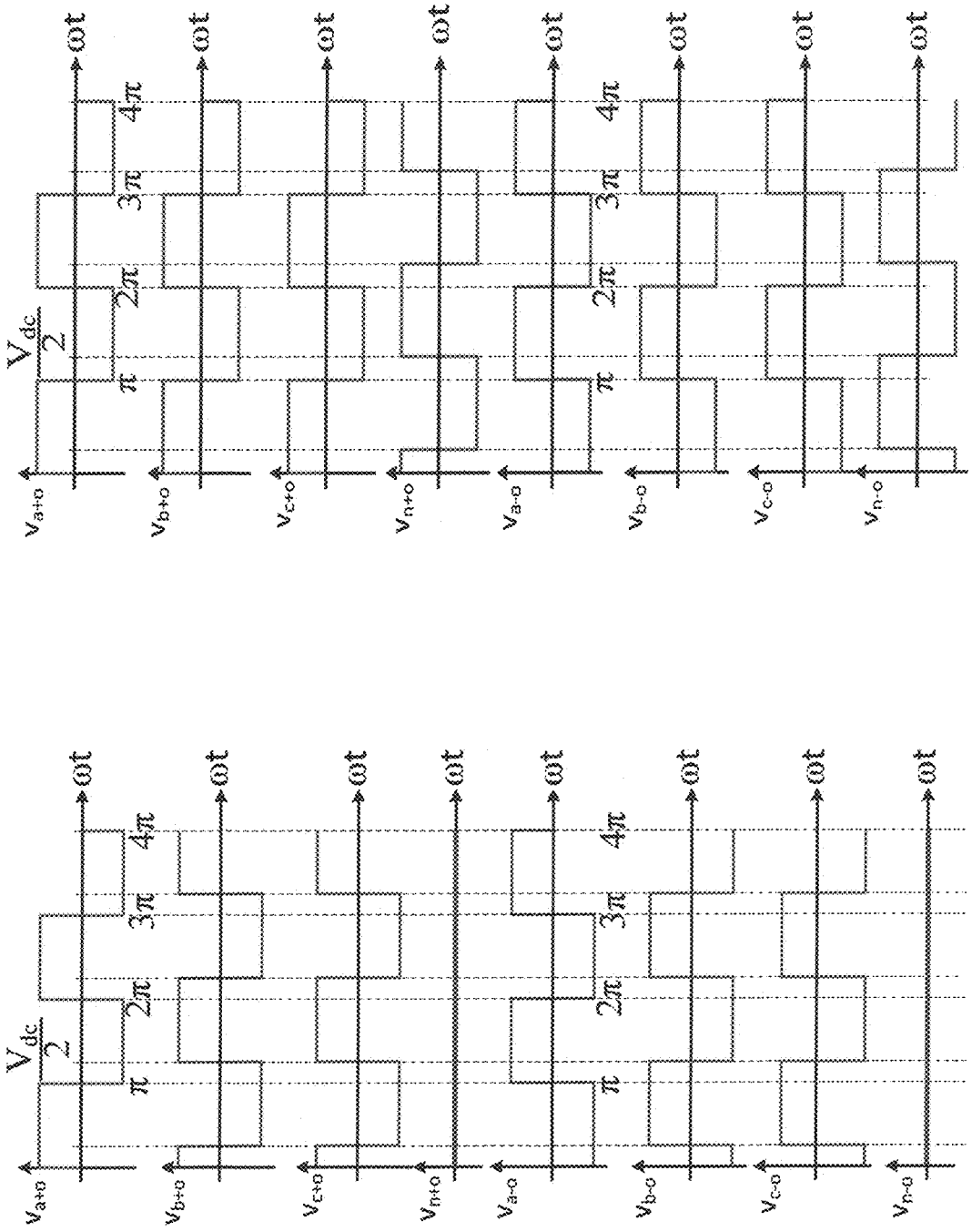

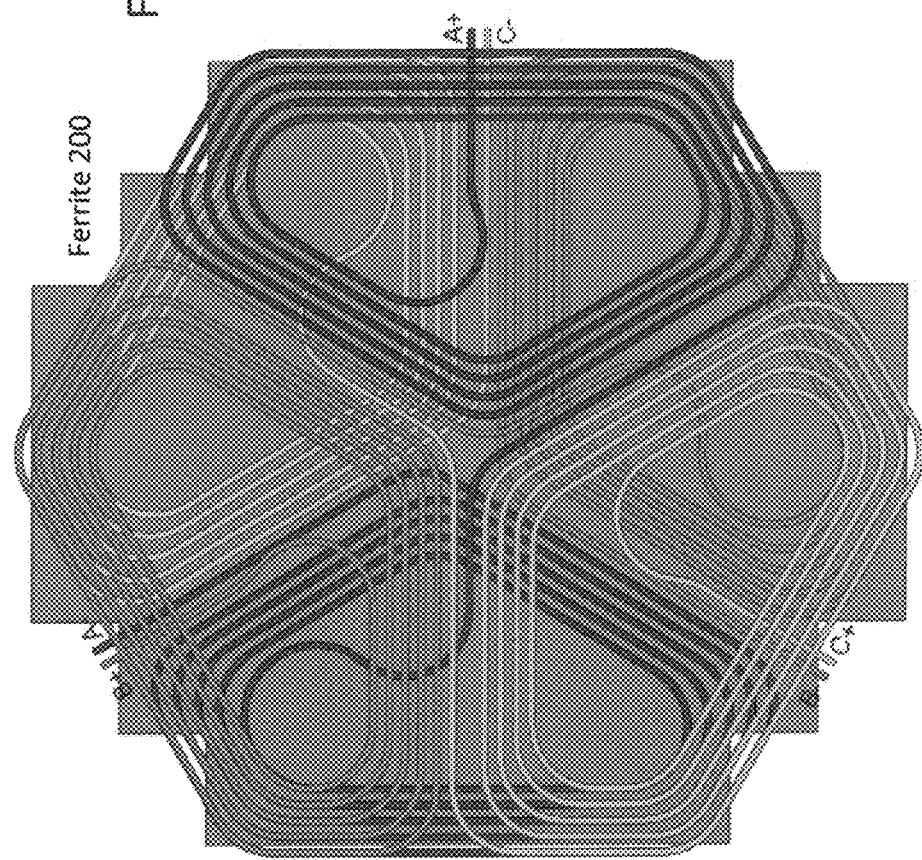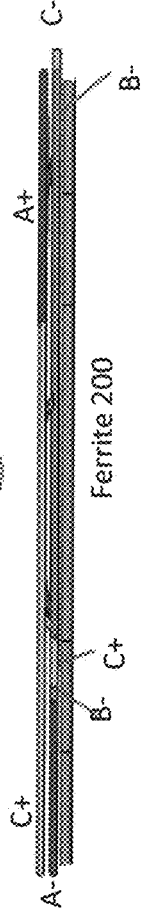
Fig. 29A
Fig. 29B

Fig. 32

| | C (nF) | V($V_{RMS}$) | Construction |
|---|---|---|---|
| YC-ΔL | 267.2 | 1490 | (0.25\|0.25)-(0.25\|0.33) |
| YC-YL | 90.7 | 2206 | 0.25-0.25-0.33 |

Fig. 33

|  | Aligned | $\Delta\varphi=30°$ | $\Delta x=-10$ cm<br>$\Delta y=+10$ cm |
|---|---|---|---|
| $V_{dc,g}$ | 554.9 V | 555.9 V | 312.7 V |
| $R_{dc,v}$ | 6.839 Ω | 6.842 Ω | 6.764 Ω |
| $P_{g,dc}$ | 52.60 kW | 52.53 kW | 11.79 kW |
| $P_{v,dc}$ | 50.03 kW | 50.02 kW | 10.44 kW |
| $V_{dc,v}$ | 584.9 V | 585.0 V | 265.8 V |
| $\eta$ | 95.1 % | 95.2 % | 88.5 % |

Fig. 34

|  | Aligned | $\Delta\varphi=30°$ | $\Delta x=-10\,\text{cm}$<br>$\Delta y=+10\,\text{cm}$ |
|---|---|---|---|
| $V_{dc,g}$ | 297.3 V | 297.3 V | 169.9 V |
| $R_{dc,v}$ | 2.283 Ω | 2.279 Ω | 2.275 Ω |
| $P_{g,dc}$ | 53.15 kW | 53.34 kW | 12.11 kW |
| $P_{v,dc}$ | 50.13 kW | 50.25 kW | 10.48 kW |
| $V_{dc,v}$ | 338.3 V | 338.4 V | 154.4 V |
| $\eta$ | 94.3 % | 94.2 % | 86.5 % |

Fig. 35

| Topology | Power (kW) | Copper Mass (kg) | Ferrite Mass (kg) | Specific Power (kW kg$^{-1}$) | Copper Loss (W) | Ferrite Loss (W) | Efficiency (%) | Surface Flux (mT) | $\frac{P}{B_{max}^2}$ (pu) | Phase Voltage (kV RMS) |
|---|---|---|---|---|---|---|---|---|---|---|
| 1pU | 24.5 | 1.03 | 1.92 | 8.31 | 72 | 59 | 98.93 | 5.09 | 0.679 | 1.39 |
| 1pB | 36.6 | 1.67 | 5.70 | 4.97 | 117 | 66 | 99.00 | 6.69 | 0.587 | 2.98 |
| 3pU(1p) | 14.7 | 1.80 | 1.96 | 3.91 | 125 | 41 | 97.74 | 3.85 | 0.712 | 0.69 |
| 3pU | 49.3 | 2.47 | 5.83 | 5.94 | 172 | 91 | 98.93 | 8.26 | 0.835 | 1.74 |
| 3pB | 62.7 | 3.19 | 5.02 | 7.64 | 222 | 108 | 98.95 | 6.71 | 1.008 | 1.79 |
| 3pB(3L) | 75.1 | 3.44 | 5.75 | 8.17 | 240 | 108 | 99.07 | 7.44 | 0.974 | 5.33 |

POLYPHASE WIRELESS POWER TRANSFER SYSTEMS, COIL ASSEMBLIES AND RESONANT NETWORKS

CROSS-REFERENCE TO RELATED APPLICATIONS

This application is a continuation application of U.S. application Ser. No. 17/420,486 filed on Jul. 2, 2021, which is a National Phase application of PCT/US2020/012074 filed on Jan. 2, 2020, which claims the benefit of and priority to U.S. Provisional Application Ser. No. 62/787,401 filed Jan. 2, 2019 and U.S. Provisional Application Ser. No. 62/938,476 filed on Nov. 21, 2019, the contents of which are incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

This disclosure relates to polyphase wireless power transfer systems. This disclosure also relates to coil assemblies and resonant networks for polyphase wireless power transfer systems.

BACKGROUND

Wireless power transfer is used to charge various different loads such as batteries. Some known wireless power transfer systems use a single phase coil system in at least the transmitter. Single phase designs work by pulsing the flux produced by the primary coil with time. Part of this time-varying flux couples with the secondary coil and induces a voltage. The induced voltage causes a current to flow, transferring power to the load. However, power transfer and time needed are limited by certain design constraints in a single phase system. For example, in a single phase system, power transfer capabilities are limited by electromagnetic field emissions requirements and foreign object heating (touch safety) limits, the size and mass of the transmitting and receiving coil assemblies.

There is a push to higher power charging and a quicker charging timing. For example, a goal is to provide a charging rate for an electric vehicle on parity with a traditional vehicle refueling time. The feasibility of high-power wireless power transfer greatly depends on the ability to improve the power density and specific power of wireless charging systems.

Certain polyphase wireless transfer systems have been designed to increase power transfer for electric vehicles, however, since there is a non-zero interphase mutual-inductance, which may be unbalance between phases, power transfer capability may be compromised and reduced for these systems.

SUMMARY

Accordingly, disclosed are polyphase wireless power transfer systems that have compensation networks that may account for both balanced and unbalanced inter-phase mutual inductances and non-orthogonal coil structures.

Accordingly, disclosed is a polyphase inductive power transfer system comprising a transmitter having at least one coil associated with each phase. The transmitter also has a compensating capacitance, for each phase, connected in series with the at least one coil. The value of the compensating capacitance, for each phase, is determined such that the transmitter has at least two independently excitable resonant modes at a resonant frequency. The independently excitable resonant modes may be orthogonal.

In some aspects of the disclosure, the independently excitable resonant modes comprises $\alpha$-axis and $\beta$-axis modes. In other aspects of the disclosure, the independently excitable resonant modes comprises $\alpha$-axis, $\beta$-axis modes and y-axis modes.

In some aspects of the disclosure, the value of the compensating capacitance may be based on a topology of the compensating capacitance. In other aspects of the disclosure, the value may be based on the inductance of the coil(s) for each phase and the mutual inductances.

In some aspects of the disclosure, the phases may bipolar. In other aspects, the phases may be unipolar. When the phases are bipolar, each phase has two coils of opposite polarities.

In some aspects of the disclosure, the coils are layered in a coil assembly. The coil assembly may comprise one or more layers of coils stacked on a ferrite. In some aspects, coils for different phases are located on different layers. In other aspects, coils having different polarities are located on different layers. For example, coils having the same polarity are one layer and coils having an opposite polarity are a second layer.

In some aspects of the disclosure, the coil assembly comprises a housing. The ferrite and the layers may be disposed in the housing. The coils may be positioned using one or more wireguides and may be secured in place using a thermal epoxy.

In some aspects of the disclosure, the connections to the compensating capacitance are co-planar with the coils.

In some aspects of the disclosure, the topology may be one of a series delta-capacitance-delta inductance, a series wye-capacitance-delta inductance, a series delta-capacitance-wye inductance or a series wye-capacitance-wye inductance. In other aspects, the system may also comprise a compensating network. The compensating network may have an LCC configuration.

In some aspects of the disclosure, the system further comprises a receiver having at least one coil per phase. The receiver also has a compensating capacitance connected in series with the at least one coil for each phase. The value of the compensating capacitance determined, for each phase, such that the receiver has at least two independently excitable resonant modes at the resonant frequency.

Also discloses are polyphase coil assemblies. The polyphase coil assemblies may be bipolar. For example, in some aspects of the disclosure, the coil assembly may comprise a ferrite and two coils for each of the polyphases. The two coils have opposite polarity. The assembly may be a single layer. In this aspect, the coil for different phases are interleaved where coils of opposite polarity are on opposite sides of the layer. The distance between each coil and the ferrite is the same. In some aspects, all connections to a compensation network are co-planar with the coils.

In other aspects, the coil assemblies may be multiple layers. For example, the assembly may comprise layers where coils for the same phase are on the same layer where coils for the different phases have a different distance to the ferrite.

In other aspects, disclosed is a double layer coil assembly. The double layer coil assembly may comprise a ferrite and two coils for each of the phases. Coils for the same phases are located on different layers where the coils having the same polarity are located on the same layer. Coils for the same phase that have opposite polarity are not aligned in a stacked direction, and the distance between the ferrite and each layer is different. In an aspect, when there are three-phases, each coil spans 120° of a respective layer.

In an aspect, the ferrite may be formed by ferrite tiles.

In an aspect, the phases may have a balanced self and mutual inductance.

Also disclosed is a polyphase wireless power transfer system where the transmitter may transfer power to different types of receivers. The system may comprises a transmitter having at least one coil associated with each phase, a compensating network connected with the at least one coil for each phase, an inverter and a controller. The inverter may comprise a plurality of switching pairs. Each switching pair respectively electrically coupled to the compensating network and the at least one coil for a respective phase. The controller may be electrically coupled to each of the plurality of switching pairs to selectively turn OFF or ON a respective switch. In some aspects of the disclosure, the timing in which each of the switching pairs is turned OFF or ON is based on a type of receiver being inductively coupled to the transmitter.

In some aspects of the disclosure, the system further comprises a wireless interface. The receiver may transmit its type to the transmitter. In transmitter may receive the type via the wireless interface. The controller may control the timing based on the received type of receiver.

In other aspects of the disclosure, the controller detects the type of receiver. For example, the system may further comprise a memory configured to store electrical properties associated with the types of receiver. The controller may be configured with a test mode. In the test mode, the controller may control the switching pairs to sequentially excite a plurality of excitable resonant modes for a set time. For each of the excitable resonant modes, the controller may receive sensed electrical properties. The controller may comprise the sensed electrical properties with the stored electrical properties and determine a match. When there is a match, the type of receiver associated with the matched electrical properties may be determined as the receiver. In some aspects of the disclosure, the controller controls the timing based on the detected type of receiver.

In other aspects of the disclosure, the system may further comprise a camera. The camera may detect an alignment condition between the coil(s) in the transmitter and the coil(s) in the receiver. The alignment condition may include translational and rotational alignment. In some aspects of the disclosure, the controller may control the timing based on the detected alignment condition by the camera.

In other aspects of the disclosure, the controller detects the alignment condition. In this aspect, the system may further comprise memory configured to store electrical properties associated with the a plurality of translational and rotational alignment conditions for each type of receiver, Further, in this aspect, the controller may comprise the sensed electrical properties in the test mode for each of the plurality of excitable resonant modes with the stored electrical properties associated with the a plurality of translational and rotational alignment conditions for each type of receiver. When there is a match, the alignment condition(s) associated with the matched electrical properties may be determined as the alignment condition(s). In some aspects of the disclosure, the controller controls the timing based on the detected alignment condition(s).

In other aspects of the disclosure, the wireless interface may receive an alignment condition from the receiver and the controller may control the timing based on the received alignment condition.

In some aspects, each phase may be unipolar and the inverter may comprise another switching pair. The another switching pair is electrically coupled to a neutral of the coil for each phase. In this aspect, the controller is electrically coupled to the another switching pair to selectively turn OFF or ON a respective switch. The another switching pair is controlled based on a type of receiver being inductively coupled to the transmitter.

In some aspects of the disclosure, the receiver may be a three-phase receiver or a single phase receiver. The single phase receiver may be unipolar, such as, having circular receiving or a bipolar receiver, such as, having a DD receiving coil.

When the receiver is a three-phase receiver, the controller may maintain the another switching pair OFF or turn the another switching pair OFF and control the switching of three switching pairs at a different timing.

When the receiver is a single phase bipolar receiver, the controller may maintain the another switching pair OFF or turn the another switching pair OFF and control the switching of two switching pairs of the plurality of switching pairs at the same time when rotationally aligned and a third switching pair of the plurality of switching pairs at a different timing.

When the receiver is a single phase unipolar receiver, the controller may control the switching of three switching pairs of the plurality of switching pairs corresponding to three-phases at the same time when aligned and control the another switching pair to turn ON and OFF. The another switching pair may be used to control the duty cycle.

When transmitter is bipolar, the receiver may be a three-phase receiver or a single phase bipolar receiver. The timing may be the same as when the transmitter is unipolar.

In other aspects of the disclosure, when the transmitter is bipolar, different switching pairs may be electrically coupled to the different polarity. For example, the plurality of switching pairs may comprise a plurality of first switching pairs and plurality of second switching pairs, where the first switching pairs and the second switching pairs may be electrical coupled to coils of different polarity, respectively. In this aspect, the inverter may further comprise two other switching pairs, one switching pair of the other switching pairs may be electrically coupled to neutral of coils of a first polarity for each phase and the second switching pair of the other switching pairs may be electrically coupled to the neutral of coils of the opposite polarity. In this aspect, the receiver may be a three-phase receiver or a single phase receiver that is either unipolar or bipolar.

When the type of receiver is the three-phase receiver, the controller may maintain the each of the two other switching pairs OFF or turn each of the two other switching pairs OFF and control the switching of the plurality of first switching pairs and the plurality of second switching pairs such that switching pairs coupled to coils of opposite polarities of the same phase are controlled at the same time and switching pairs coupled to coils of different phases are controlled at different times.

When the type of receiver is the single phase bipolar receiver, the controller may maintain the two other switching pairs OFF or turn the two other switching pairs OFF and control the switching of the plurality of first switching pairs and the plurality of second switching pairs such that switching pairs coupled to coils of opposite polarities of the same phase are controlled at the same time and switching pairs coupled to two phases of the three-phases are controlled simultaneously when rotationally aligned and switching pairs coupled to a third phase are controlled at a different time.

When the type of receiver is the single phase unipolar receiver, the controller may control the switching of the plurality of the first switching pairs and the plurality of second switching pairs such that the switching pairs coupled to coils of the three-phases are controlled at the same time when aligned and control the two other switching pairs to turn ON and OFF. In this aspect, the two other switching pairs may be controlled to vary a duty cycle of the three-phases.

BRIEF DESCRIPTION OF THE DRAWINGS

The patent or application file contains at least one drawing executed in color. Copies of this paper or patent application publication with color drawing(s) will be provided by the Office upon request and payment of the necessary fee.

FIG. 2A and FIG. 2B illustrate views of a single layer coil assembly in accordance with aspects of the disclosure;

FIG. 3A and FIG. 3B illustrate views of a double layer coil assembly in accordance with aspects of the disclosure;

FIG. 4A and FIG. 4B illustrate views of a triple layer coil assembly in accordance with aspects of the disclosure;

FIG. 5 illustrates a relationship between the phase winding placements and the α-axis, the β-axis and the y-axis;

FIG. 8A illustrates an example of a resonant mode for a double layer coil assembly and FIG. 8B illustrates an example of a ß resonant mode for a double layer coil assembly in accordance with aspects of the disclosure;

FIG. 26 illustrates a timing diagram showing the inverter control for the transmitter in FIG. 25 accordance with aspects of the disclosure where the receiving coils have a DD arrangement;

FIG. 27 illustrates a timing diagram showing the inverter control for the transmitter in FIG. 25 accordance with aspects of the disclosure where the receiving coil has a circular arrangement;

FIGS. 29A-29B illustrate a diagram of a double layer coil assembly used in testing a polyphase wireless power transfer system in accordance with aspects of the disclosure, the diagram illustrates the phase winding layout including locations of the connection;

FIG. 32 illustrates the nominal compensating capacitance values for the two resonant network topologies used in the experiment;

FIGS. 33 and 34 illustrate the experiential results for the two resonant network topologies;

FIG. 35 illustrates simulation results between different transmitter coil assemblies including single phase and three-phase assemblies.

DETAILED DESCRIPTION

The term "bipolar" used herein refers to a flux produced by one coil has a natural return path through its twin. For example, if the current direction through phase A+ produces a flux in the positive z-direction, then the current direction through phase A− produces a flux in the negative z-direction. In the description, where the coil assembly comprises bipolar windings (also referred to herein as coils), the windings may be referred to in pairs. The individual windings composing each pair are wound opposite in polarity. The sense of the winding direction is indicated by a + or −.

The term "polyphase" used herein refers to the transmitter and/or receiver in a wireless power transfer system having more than one phase. A polyphase system may rotate the field to transfer power.

Figure 1:
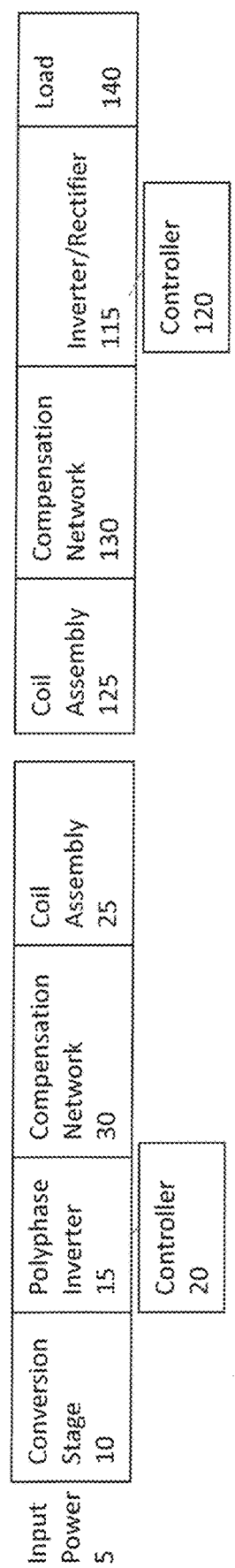
FIG. 1 illustrates a block diagram of a polyphase wireless power transfer system in accordance with aspects of the disclosure.

FIG. 1 illustrates a block diagram of a polyphase wireless power transfer system in accordance with aspects of the disclosure. The system 1 comprises a transmission side (transmitter) and a reception side (receiver). The transmitter comprises a polyphase coil assembly 25. In an aspect of the disclosure, the coil assembly 25 is unipolar, e.g., a single coil such as in FIGS. 12 and 14. In other aspects, the cols assembly 25 is bipolar, e.g., two coils per phase, such as in FIGS. 19, 21, 23 and 25.

In an aspect of the disclosure, there may be three-phase (either unipolar or bipolar) in the transmitter. The transmitter may be used with multiple different types of receivers. The compatibility of the system is achieved via the polyphase inverter 15 and control thereof.

In an aspect of the disclosure, the receiver may be a polyphase receiver. In other aspects of the disclosure, the receiver may be a single phase receiver. The single phase receiver may be unipolar or bipolar. A unipolar receiver may include circular arranged coil and a bipolar receiver includes a double D or "DD" coil. The unipolar receiver is not limited to a circularly arranged coil, but may have other configurations such as square, hexagonal, etc.

The system 1 comprises a conversion stage 10. The conversion stage 10 takes an input power 5 and converts the same to an input to a polyphase inverter 15. The input power 5 may be a single-phase AC source. For example, the input power 5 may be 120 VAC at 60 Hz. In other aspects, the input power 5 may be a three-phase AC source. For example, the input power 5 may be obtained from a utility grid. The input power 5 may be 480 VAC at 60 Hz. The input power 5 may depend on the location and source. For example, the input power 5 may also be 400 VAC at 50 Hz. When the input power 5 is three-phase AC, the conversion stage 10 may be an AC to DC converter with a power factor correction. The conversion stage 10 may comprises a plurality of power blocks, each having one or more power modules. Each power block may convert a preset power amount. The conversion stage 10 may output a regulated DC voltage (DC bus) for the polyphase inverter 15. The value of the DC bus may be set for a specific application. For example, in aspects of the disclosure, the DC bus is 200V. In other aspects of the disclosure, for fast charging and high power, the DC bus may be 1000V.

In other aspects of the disclosure, the input power 5 may be a high voltage DC source such as a high voltage battery. For example, an electric vehicle battery may be used to charge another electric vehicle battery, e.g., load 140. In this example, the conversion stage 10 may be a DC to DC converter. The DC bus voltage may be the same as described above.

Figure 12:
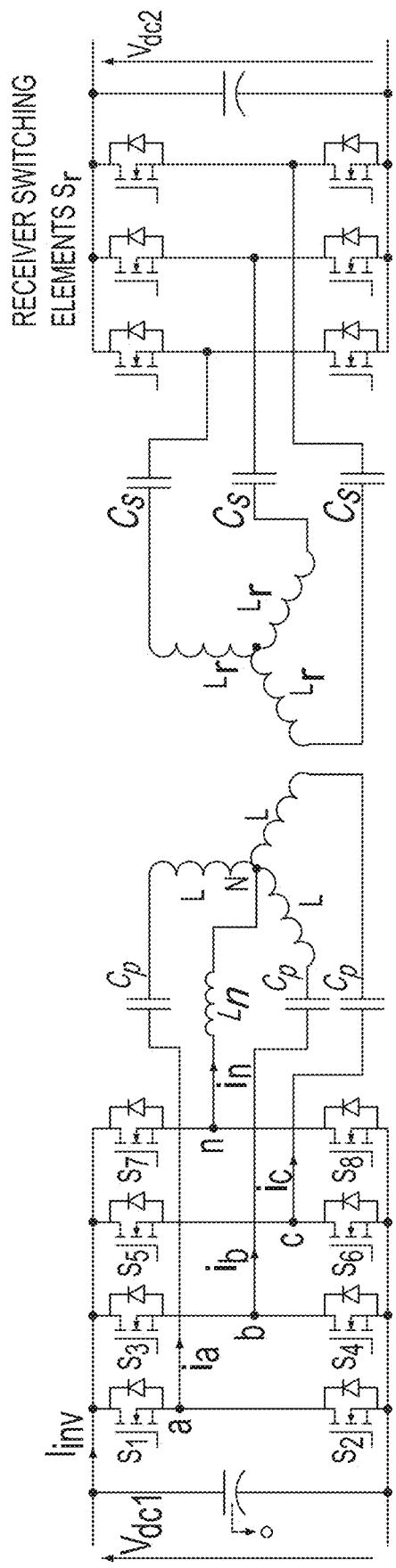
FIG. 12 illustrates a diagram of a wireless power transfer system in accordance with aspects of the disclosure, where a three-phase unipolar transmitter is used and a three-phase receiver is used.
Figure 23:
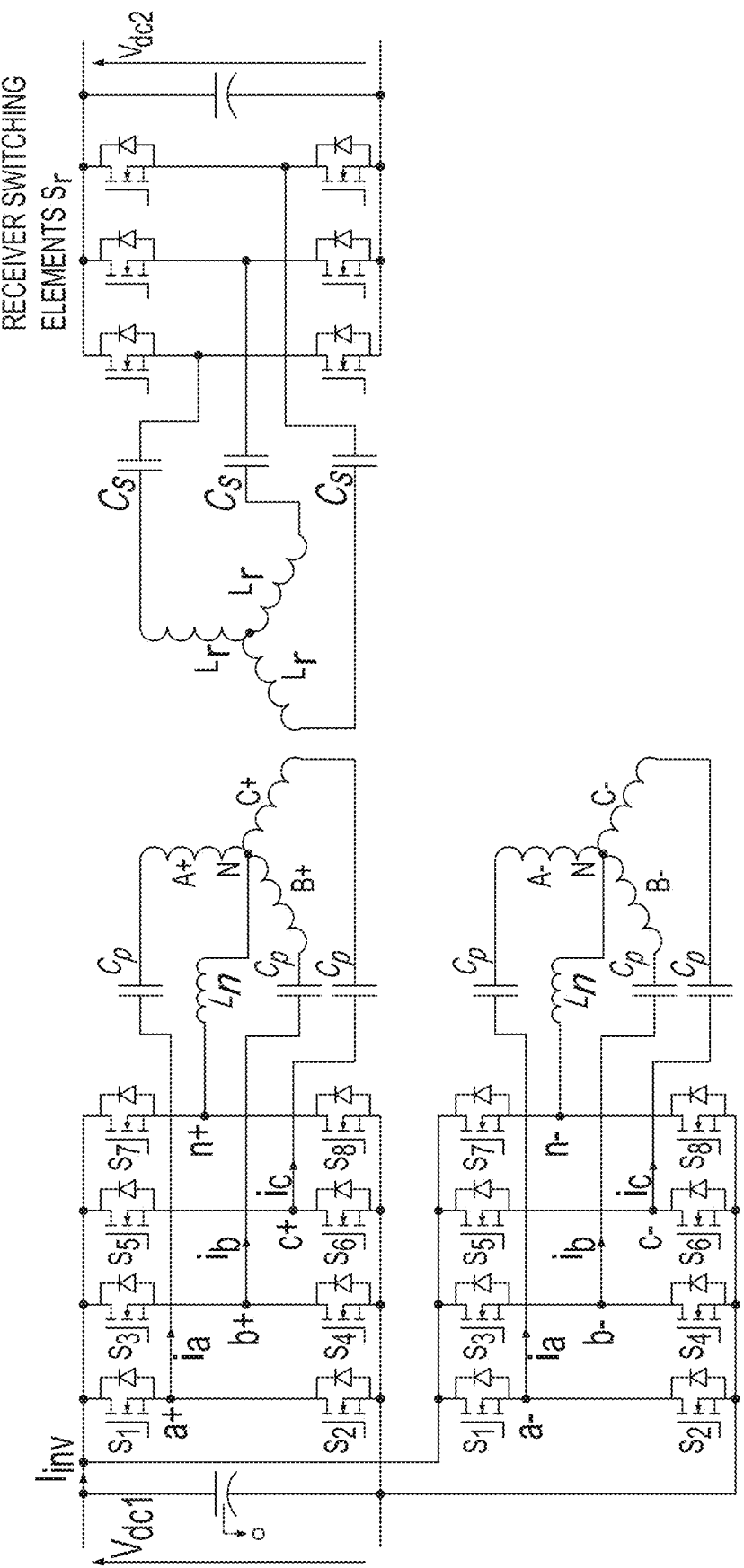
FIG. 23 illustrates a diagram of another wireless power transfer system in accordance with aspects of the disclosure, where a three-phase bipolar transmitter is used and a three-phase receiver is used.

The polyphase inverter 15 comprises a plurality of switching pairs. The number of switching pairs may be dependent on the number of phases in the coil assembly 25 and polarity of the coils. For example, as shown in FIG. 12, there are three sets of switching pairs for a three-phase unipolar transmitter, (set 1—S1 and S2, set 2, S3 and S4, set 3, S5 and S6) (see also FIG. 19 for a three-phase bipolar transmitter). In another aspect of the disclosure, as shown in FIG. 23, there are six sets of switching pairs for a three-phase bipolar transmitter, two sets for each phase, one for a positive polarity (pole) and one for a negative polarity (pole).

In an aspect of the disclosure, the polyphase inverter 15 further comprises an additional set of switching pairs (e.g., switches S7 and S8) (see, e.g., FIGS. 12 and 14) for configuring the transmitter for transfers to different receivers.

Each switch (hereinafter switching element) may comprise a MOSFET.

The system 1 further comprises a controller 20. The controller 20 may be a microcontroller or microcontroller or any other processing hardware such as a CPU or GPU or FPGA. In an aspect of the disclosure, the controller 20 acts as a gate driver to turn ON and OFF each switching element of the switching pairs.

The coil assembly 25 comprises one or more layers of coils. The coil assembly 25 may be unipolar or bipolar. FIG. 2A and FIG. 2B illustrate an example of a three-phase bipolar coil assembly having a single layer. Each coil of the single layer assembly occupies ⅙ of the circumference of the layer, e.g., 60°. The coil assembly 25 comprises a ferrite backing 200. The ferrite backing 200 may be constructed by arranging multiple smaller ferrite tiles. The coils are positioned with a winding guide. The winding guide may be fabricated with 3D printing. The wire may be wrapped in the winding guide. The number of turns and gauge, e.g., AWG, may be based on a specific application including power density required and target size and height of the coil assembly 25. The coils may be made of Litz wire. As shown in FIG. 2A, the coils having different polarity are positioned on opposite sides of the layer. The coils of the same phase may be connected in series. Since the coils are planar and located on a single layer, the coils A+−, B+−, C+− have the same distance to the ferrite 200. The coils will also have the same self-inductance and the pairs will have the same mutual inductance.

The coils may be locked into place using a thermal epoxy (not shown). The connections with the compensation network 30 and polyphase inverter 15 are not shown in FIG. 2A and FIG. 2B. The connections are in-line or aligned with the coils. This allows for the coil assembly 25 to be thin. The coil assembly 25 also comprises a cover or housing (not shown in figures).

FIG. 3A and FIG. 3B illustrate an example of a three-phase bipolar coil assembly having a double layer (also referred to herein as dual layers or two layers). In an aspect of the disclosure, coils having one polarity, e.g., A+, B+ and C+ are arranged on one layer, whereas coils having another polarity, e.g., A−, B−, and C− are arranged on the other layer. As shown in FIG. 3A, the coils are staggered in the stacked direction. For example, the coils may be staggered by 60°.

Each coil occupies ⅓ of the circumference of the layer, e.g., 120°. As shown in FIG. 3A, the coils having different polarity are positioned on opposite sides of the layer. For example, coil A− may be located on a top layer, where coil A+ is located on a bottom layer on the opposite side, e.g., 180° offset. The coils of the same phase may be connected in series. As shown in FIG. 3B, the coils on the top layer are farther from the ferrite 200 than coils on the bottom layer. The windings on one layer will have one set of self- and mutual-inductances, and the windings on the other layer will have a different set of self- and mutual-inductances. However, since the positive and negative poles of each phase occur on different layers, when the individual phase coils in the double layer are connected in series, the overall system may have balanced inductances.

The connections with the compensation network 30 and polyphase 15 are not shown in FIG. 3A and FIG. 3B. The connections are in-line or aligned with the coils (see FIGS. 29A and 29B and 30). This allows for the coil assembly 25 to be thin.

The coils are also positioned with a winding guide. The winding guide may be fabricated with 3D printing, where the winding guide may be on both the top and the bottom on a printed structure. The wire may be wrapped in the winding guide. As with the single layer assembly, the coils are fixed in positioned with a thermal epoxy. The coil assembly 25 having a double layer also comprises a cover or housing (not shown in figures).

FIG. 4A and FIG. 4B illustrate an example of a three-phase bipolar coil assembly having a triple layer (also referred to herein as three layers). In this aspect, each layer has a different phase. For example, one layer as coils B+−, another layer as A+− and another layer has C+−. The coils for the same phase are located on opposite sides of the layer, e.g., 180°. The coils also occupy ½ of the circumference of the layer, e.g., 180°. The distance between the coils for each phase and the ferrite 200 are different. Therefore, each phase has an unbalanced inductance.

In some aspects, there may be spacers between layers of coils.

While FIGS. 2A-4B show the coil assemblies 25 with three-phases, this disclosure is not limited to three. In other aspects of the disclosure, the coil assembly 25 may comprises two-phases to create a rotating magnetic field. In this aspect, the coil assembly may be a single layer, such as in FIGS. 2A and 2B or two layers, such as shown in FIGS. 3A and 3B. In the single layer, each coil may occupy ¼ of the circumference, e.g., 90°. In the two layer coil assembly 25, each coil may occupy ½ of the circumference, e.g., 180°. In an aspect of the disclosure, coils of one polarity may be located on one layer and coils of the other polarity may be located on the other layer. In other aspects, coils for one phase may be located on one layer and coils for the second phase may be located on the second. In this aspect, the inductances may be unbalance. The two phase coil assembly 25 may have more DC-link current ripple compared with a three-phase coil assembly.

In other aspects, more than three-phases may be used. For example, five-phase, seven-phase, and higher phase systems may be used in the coil assembly 25. However, the number of phases is not limited to odd numbers. In this aspect, these coil assembly arrangements may have the benefit of reduced DC-link current ripple. For planar couplers, power transfer is proportional to 1) the number of layers, and 2) the coil span of each phase. Typically, there is a tradeoff between the number of phases and the coil span for each phase in a planar coil assembly, such as the coil assemblies 25 described herein. The coil span decreases with an increase in phases. However, larger coil spans are generally preferred to maximize the coupling between the transmitter and the receiver. Alternatively, additional layers may be added, but this will increase either the package thickness or winding voltage. Increasing the number of layers also may increase inductance imbalances between the phases. Further, increasing the phases may impact harmonics. For example, in a three-phase coil assembly 25, the third harmonic may be canceled, which may mitigate some EMI and reduce losses associated with a prominent third harmonic. However, in higher phases, the fifth, seventh, etc. harmonic may be canceled rather than the third harmonic.

Also, because each layer has a different distance from the ferrite 200, the coils on different layers may have different self-inductances and the mutual inductance between the phase coils may depend on the layer of each pair of coils.

The system 1 further comprises a compensation network 30. In accordance with aspects of the disclosure, the compensation network 30 is tuned to achieve at least two independently excitable resonant modes for a single resonant frequency. For example, the two resonant modes may be α-mode (α-axis mode) and a β-mode (β-axis mode). FIG. 5 shows the relationship between the α-axis, the β-axis and the y-axis and the coil placement. The α-axis is aligned with phase A. The β-axis is aligned with a midpoint between phases B and C. The y-axis is orthogonal to both the α-axis and the β-axis and would point out of the coil plane. Arrows in FIG. 5 represent the axis orientation.

Figure 6B:
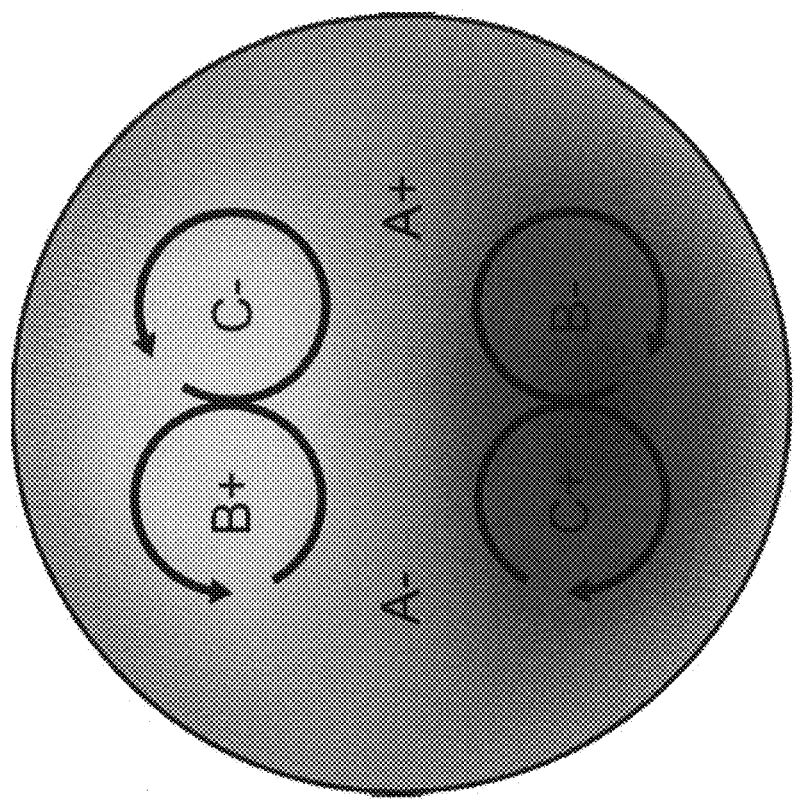
FIG. 6A illustrates an example of a resonant mode and FIG. 6B illustrates an example of a β resonant mode in accordance with aspects of the disclosure.
Figure 6A:
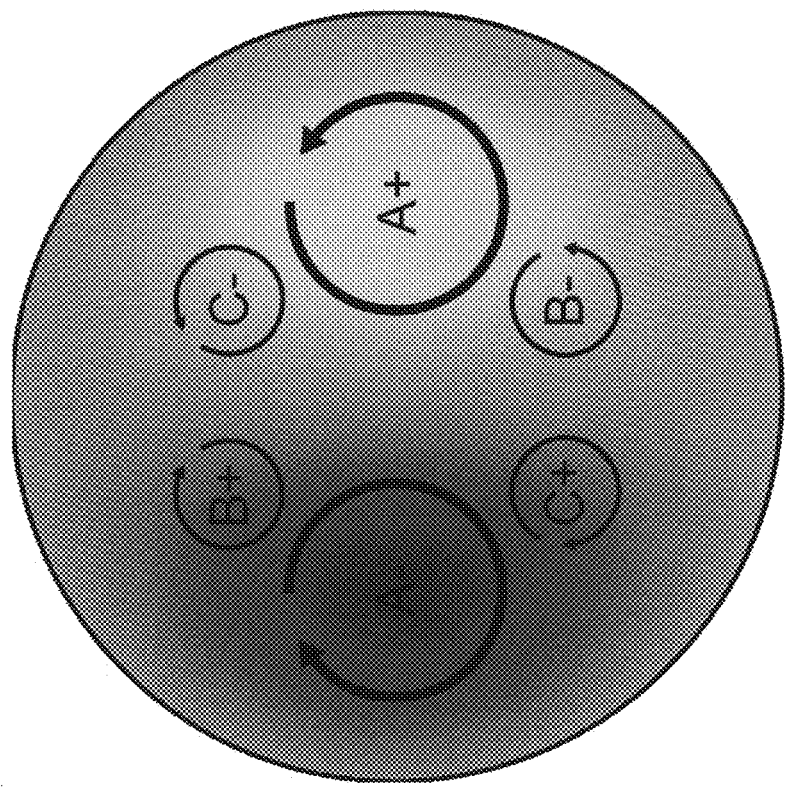

Once tuned, the α-mode and β-mode can be excited independently to produce a resonant rotating magnetic field. For example, they may be excited in quadrature (90-degrees phase shifted in time) to achieve high-efficiency constant power transfer. FIGS. 6A and 6B show examples of an α-mode and β-mode, respectively. In FIGS. 6A and 6B, the coils are not explicitly shown, however, the location is represented by letters A+, A−, B+, B−, C+ and C−, which are bipolar coils for the three-phases, A, B and C. The circular arrows represent the in-plane electrical current for each phase. As can be seen in the figure, the direction of the arrow for the different polarity is opposite. For example, for coil A+, the direction is counter-clockwise, however for coil A−, the direction is clockwise. The magnitude and direction of the magnetic flux density (which is out of the plane), e.g., out of the page, is represented by different shading. The magnitude is normalized relative to a maximum flux density for the a excitation mode, e.g., −1 to 1. As can be seen in FIG. 6A, the maximum flux density (close to 1 or −1) is aligned with the area where coils A+ or A− are located in the α-mode. However, as can be seen in FIG. 6B, in the β-mode, the flux density is rotated such that the maxiumun flux density (close to 1 or −1) is located in an area where coils B+, B−, C+ and C− are located.

Figure 7B:
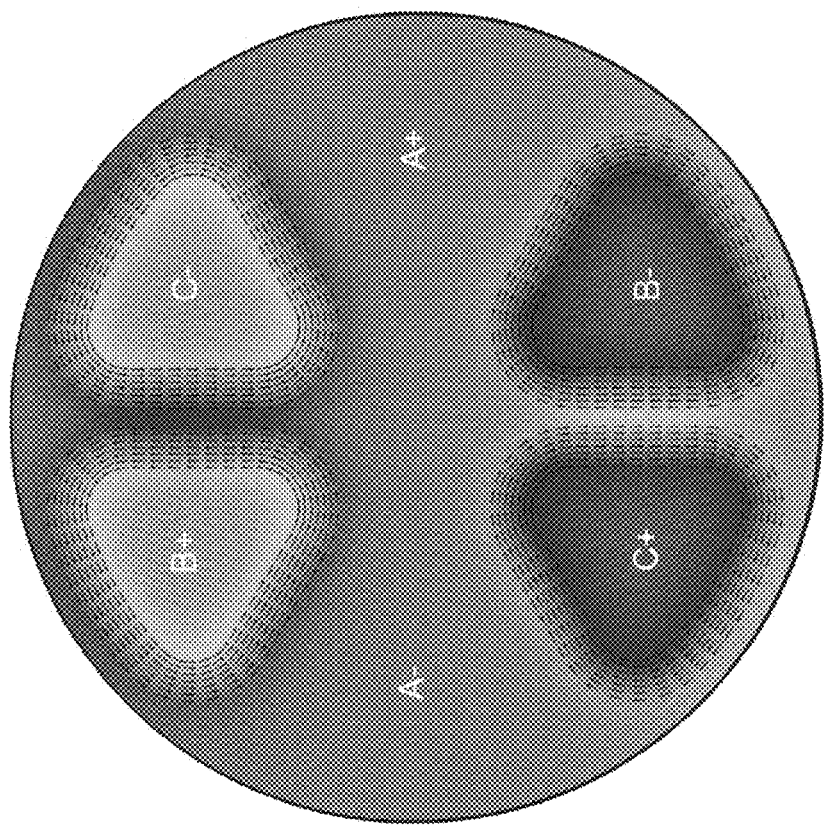
FIG. 7A illustrates an example of a resonant mode for a single layer coil assembly and FIG. 7B illustrates an example of a ß resonant mode for a single layer coil assembly in accordance with aspects of the disclosure.
Figure 7A:
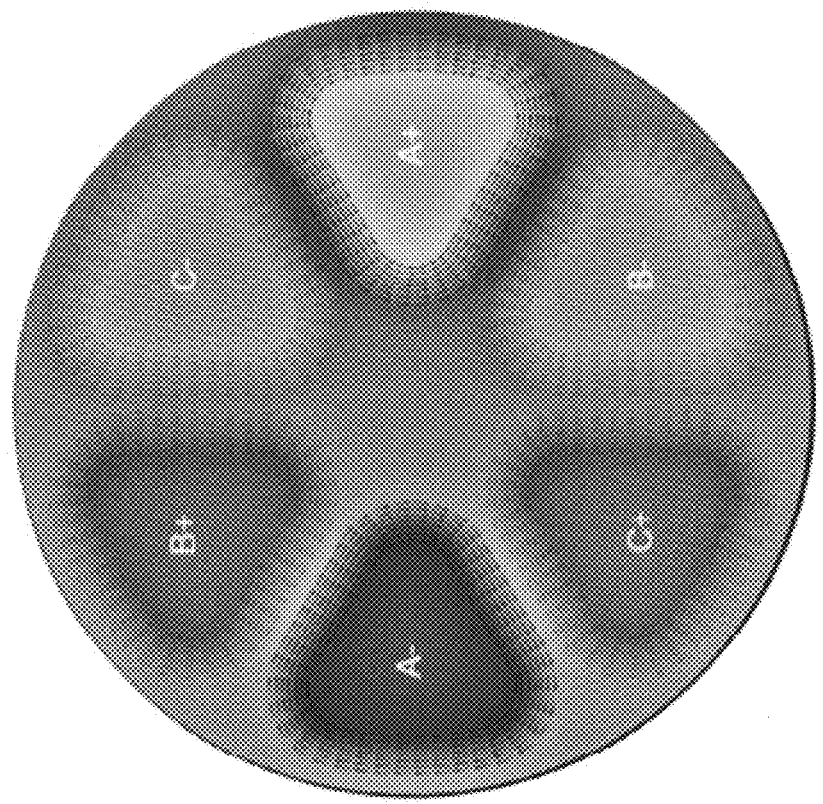

FIGS. 7A and 7B show examples of an α-mode and β-mode, respectively, for a single layer coil assembly, such as shown in FIGS. 2A and 2B. The arrows represent the magnetic and direction of the current density. The magnitude and direction of the magnetic flux density (z-component) is represented by different shading. Once again, the magnitude is normalized relative to a maximum flux density for the a excitation mode, e.g., −1 to 1.

In the α-mode (FIG. 7A), the current density and the magnetic density is highest where phase A, e.g., coils A+ and A− are located.

In the β-mode (FIG. 7B), the current density and the magnetic density is highest for phases B and C. The flux density is rotated such that the maxiumun flux density (close to 1 or −1) is located in an area where coils B+, B−, C+ and C− are located.

FIGS. 8A and 8B show examples of an α-mode and β-mode, respectively, for a double layer coil assembly, such as shown in FIGS. 3A and 3B. The arrows represent the magnetic and direction of the current density. The magnitude and direction of the magnetic flux density (z-component) is represented by different shading. Once again, the magnitude is normalized relative to a maximum flux density for the a excitation mode, e.g., −1 to 1.

Since the coils occupy a larger area in the double layer coil assembly, the areas showing higher electric current and magnetic flux are larger compared with the single layer coil assembly. FIG. 8A shows the electric current flowing in both layers.

In the α-mode (FIG. 8A), the current density and the magnetic flux density is highest where phase A, e.g., coils A+ and A− are located.

In the β-mode (FIG. 8B), the current density and the magnetic flux density is highest for phases B and C. The flux density is rotated such that the maxiumun flux density (close to 1 or −1) is located in an area where coils B+, B−, C+ and C− are located and in particular, as shown in FIG. 8B, the maxmium flux density is located where phases B and C overlap.

Figure 9B:
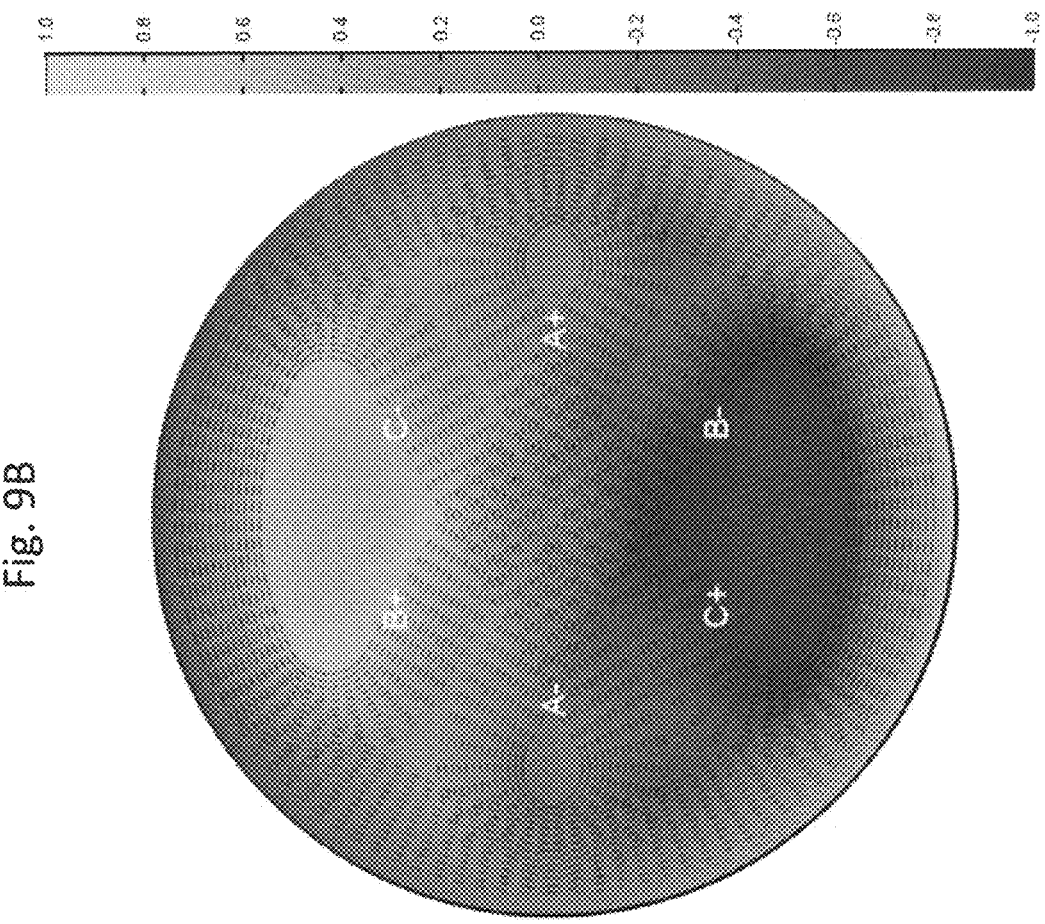
FIG. 9A illustrates an example of a resonant mode for a triple layer coil assembly and FIG. 9B illustrates an example of a ß resonant mode for a triple layer coil assembly in accordance with aspects of the disclosure.
Figure 9A:
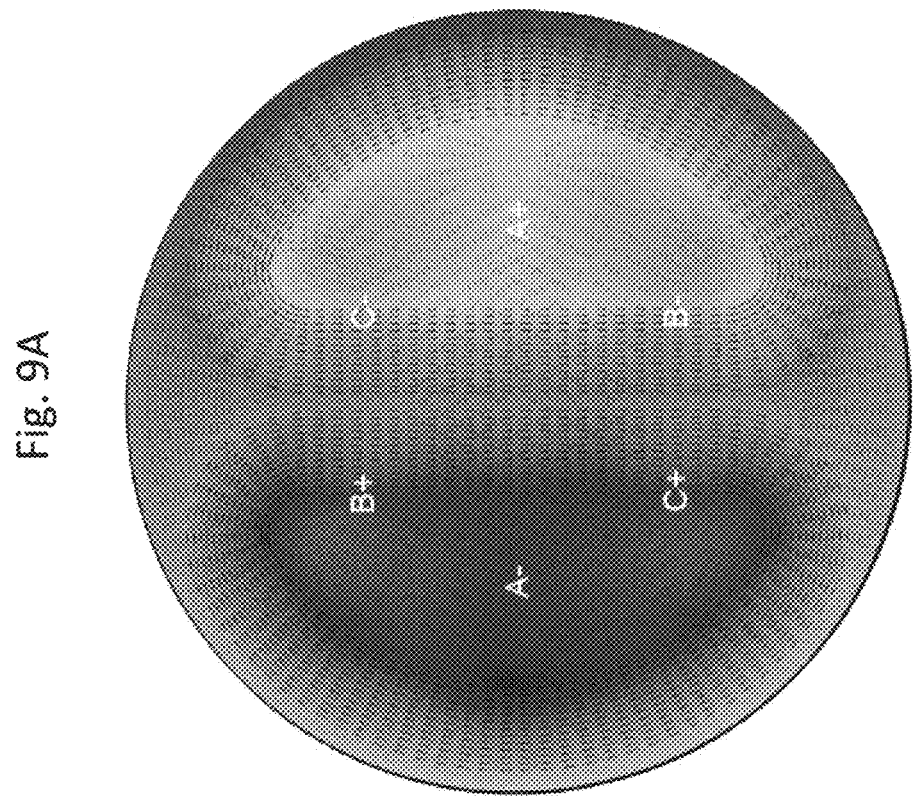

FIGS. 9A and 9B shows examples of an α-mode and β-mode, respectively, for a triple layer coil assembly, such as shown in FIGS. 4A and 4B. The arrows represent the magnetic and direction of the current density. The arrows represent current on the three layers. The magnitude and direction of the magnetic flux density (z-component) is represented by different shading. Once again, the magnitude is normalized relative to a maximum flux density for the a excitation mode, e.g., −1 to 1.

Since the coils occupy a larger area in the triple layer coil assembly, than both the double layer coil assembly and the single layer coil assembly, the areas showing higher electric current and magnetic flux are larger compared with the single layer coil assembly and the double layer coil assembly.

In the α-mode (FIG. 9A), the current density and the magnetic flux density is highest where phase A, e.g., coils A+ and A− are located. As shown in FIG. 9A, the maximum flux density (close to 1 and −1), occupies a large portion of the assembly.

In the β-mode (FIG. 9B), the current density and the magnetic flux density is highest for phases B and C. The flux density is rotated such that the maxiumun flux density (close to 1 or −1) is located in an area where coils B+, B−, C+ and C− are located and in particular, as shown in FIG. 9B, the maxmium flux density is located where phases B and C overlap.

In FIGS. 6A-9B, the ferrite 200 is shown.

Figure 10B:
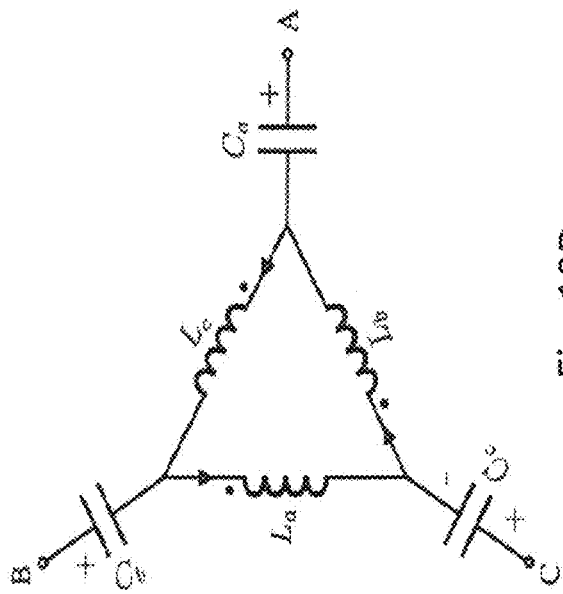
FIGS. 10A-10D illustrate diagrams of four examples of types of resonant network topologies, where capacitance is used as a compensation network in accordance with aspects of the disclosure.
Figure 10D:
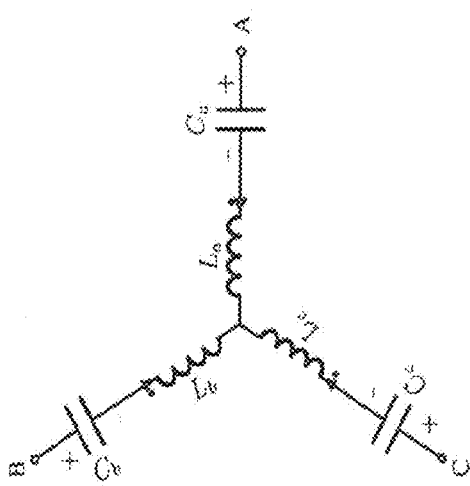
Figure 10A:
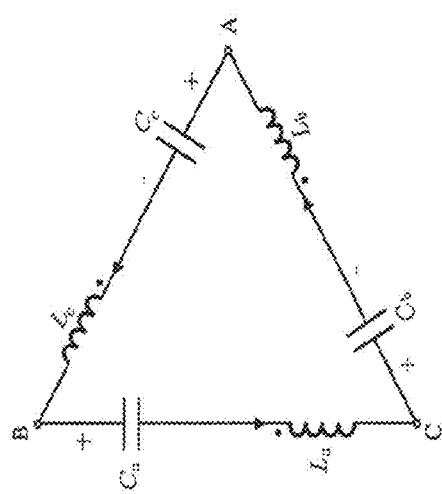
Figure 10C:
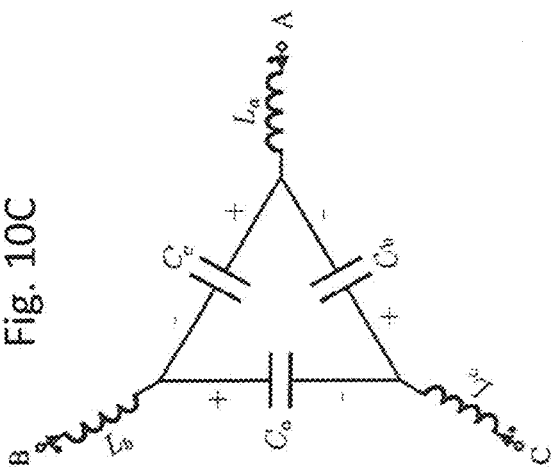

In an aspect of the disclosure, the compensation network 30 includes capacitance. The capacitance may be in the form of a single capacitor for each phase or multiple capacitors. For example, capacitance $C_a$, $C_b$, $C_c$ may be connected in series with the coil for each phase, e.g., $L_a$, $L_b$ and $L_c$, respectively. The compensation network, such as the series capacitance, and the coils may be connected in various different topologies (herein referred to as series resonant network topologies). FIGS. 10A-10D illustrate four different series resonant network topologies for three-phases. In the figures, the coils for the phases are represented by $L_a$, $L_b$ and $L_c$ and the capacitance for the phases are represented by $C_a$, $C_b$, $C_c$. For example, the tuning capacitance for phase A is $C_a$ and so on. FIG. 10A is a ΔC-ΔL configuration; FIG. 10B is a YC-ΔL configuration; FIG. 10C is a ΔC-YL configuration; and FIG. 10D is a YC-YL configuration. Δ refers to a delta configuration and Y refers to a wye configuration.

In accordance with aspects of the disclosure, the values of the capacitance, $C_a$, $C_b$, $C_c$ may have different values based on the different series resonant network topologies and coil assembly design. For example, a coil assembly having three layers may have an unbalanced self and mutual inductance, whereas a coil assembly having one or two layers may have a balanced self and mutual inductance.

For purposes of the description the mutual inductance between phase A and phase B is represented as $M_{ab}$, the mutual inductance between phase B and phase C is represented as $M_{bc}$ and the mutual inductance between phase C and phase A is represented as $M_{ca}$. When the coil assembly 25 has a balanced mutual inductance:

$$M_{ab} = M_{bc} = M_{ca} \quad (1)$$

Thus, the mutual inductance may be referred to as M, when balanced.

The self inductance is also balanced where $$L_a = L_b = L_c \quad (2)$$

Thus, the inductance may be referred to as L, when balanced. The effective inductance associated with a balance system is L', where $$L' = L - M \quad (3)$$

The capacitance for a ΔC-ΔL resonant network topology such as shown in FIG. 10A may be determined based on the following:

when balanced:

$$\omega^2 C_i = \frac{1}{L'} \quad (4)$$

where L' is defined in equation 3, ω is the resonant frequency, and i is the phase, such as a, b, or c for the three-phase system.

When the coil assembly 25 has an unbalance self and mutual inductance, such as when the coil assembly is three layers, the capacitance for a ΔC-ΔL resonant network topology such as shown in FIG. 10A may be determined based on the following:

$$\omega^2 C_i = \frac{M_{jk}}{L_i M_{jk} - M_{ij} M_{ki}} \quad (5)$$

where L' is defined in equation 3, ω is the resonant frequency, and i, j, and k are the phases, such as a, b, or c for the three-phase system. For example, when i is a, j is b and k is c. When i is b, j is c and k is a and when i is c, j is a and k is b. For instance, when i is a, $M_{jk}$ is $M_{bc}$, $M_{ij}$ is $M_{ab}$ and $M_{ki}$ is $M_{ca}$.

The capacitance for a YC-ΔL resonant network topology such as shown in FIG. 10B may be determined based on the following:
when balanced:

$$\omega^2 C_i = \frac{3}{L'} \quad (6)$$

where L' is defined in equation 3, ω is the resonant frequency, and i is the phase, such as a, b, or c for the three-phase system.

When the coil assembly has an unbalance self and mutual inductance, such as when the coil assembly is three layers, the capacitance for a YC-ΔL resonant network topology such as shown in FIG. 10B may be determined based on the following:

$$\omega^2 C_i = \frac{L^\sigma}{L_j^\delta L_k^\delta - L^\sigma M_{jk}} \quad (7)$$

where L' is defined in equation 3, ω is the resonant frequency, and i, j, and k are the phases, such as a, b, or c for the three-phase system. For example, when i is a, j is b and k is c. When i is b, j is c and k is a and when i is c, j is a and k is b, $L^\sigma$ which is a sum of intermediate inductances, is defined as follows:

$$L^\sigma = L_a^\delta + L_b^\delta + L_c^\delta \quad (8)$$

and the intermediate inductances for a Δ-connected inductor system (ΔL) are $$L_i^\delta = L_i + M_{ij} + M_{ki} \quad (9)$$

In equation 9, i, j and k are the phases and may be a, b or c. For instance, when i is a, $L_i$ is $L_a$, $M_{ij}$ is $M_{ab}$ and $M_{ki}$ is $M_{ca}$. Similarly, when i is b, $L_i$ is $L_b$, $M_{ij}$ is $M_{bc}$ and $M_{ki}$ is $M_{ab}$ and when i is c, $L_i$ is $L_c$, $M_{ij}$ is $M_{ca}$ and $M_{ki}$ is $M_{bc}$. The same is true in equations 5 and 7.

The capacitance for a ΔC-YL resonant network topology such as shown in FIG. 10C may be determined based on the following:
when balanced:

$$\omega^2 C_i = \frac{1}{3L'} \quad (10)$$

where L' is defined in equation 3, ω is the resonant frequency, and i is the phase, such as a, b, or c for the three-phase system.

When the coil assembly has an unbalance self and mutual inductance, such as when the coil assembly is three layers, the capacitance for a ΔC-YL resonant network topology such as shown in FIG. 10C may be determined based on the following:

$$\omega^2 C_i = \frac{L_i^\gamma}{L_i^\gamma L_j^\gamma + L_j^\gamma L_k^\gamma + L_k^\gamma L_i^\gamma} \quad (11)$$

ω is the resonant frequency, and i, j, and k are the phases, such as a, b, or c for the three-phase system. For example, when i is a, j is b and k is c. When i is b, j is c and k is a and when i is c, j is a and k is b, and the intermediate inductances associated with the Y-connected inductors (YL) are determined as follows:

$$L_i^\gamma = L_i - M_{ij} + M_{jk} - M_{ki} \quad (12)$$

Like in the other equations, i, j and k, are the phases and may be a, b or c. For instance, when i is a, $L_i$ is $L_a$, $M_{ij}$ is $M_{ab}$, $M_{jk}$ is $M_{bc}$ and $M_{ki}$ is $M_{ca}$. Similarly, when i is b, $L_i$ is $L_b$, $M_{ij}$ is $M_{bc}$, $M_{jk}$ is $M_{ca}$ and $M_{ki}$ is $M_{ab}$ and when i is c, $L_i$ is $L_c$, $M_{ij}$ is $M_{ca}$, $M_{jk}$ is $M_{ab}$ and $M_{ki}$ is $M_{bc}$.

The capacitance for a YC-YL resonant network topology such as shown in FIG. 10D may be determined based on the following:
when balanced:

$$\omega^2 C_i = \frac{1}{L'} \quad (13)$$

where L' is defined in equation 3, ω is the resonant frequency, and i is the phase, such as a, b, or c for the three-phase system.

When the coil assembly has an unbalance self and mutual inductance, such as when the coil assembly is three layers, the capacitance for a YC-YL resonant network topology such as shown in FIG. 10D may be determined based on the following:

$$\omega^2 C_i = \frac{1}{L_i^\gamma} \quad (14)$$

where ω is the resonant frequency, and i is the phase, such as a, b, or c for the three-phase system and the intermediate inductances L' are determined by equation 12.

The types of resonant networks for the system 1 are not limited to the topologies illustrated in FIGS. 10A-10D and other resonant networks may be used. For example, the resonant network may comprise an LCC configuration as shown in FIGS. 11A-11H. The values of the tuning capacitance (compensation capacitance) in each of these configurations may also be different from each other based on the type.

As described above, the transmitter described herein is compatible to transfer power to different types of receivers.

Figure 11A:
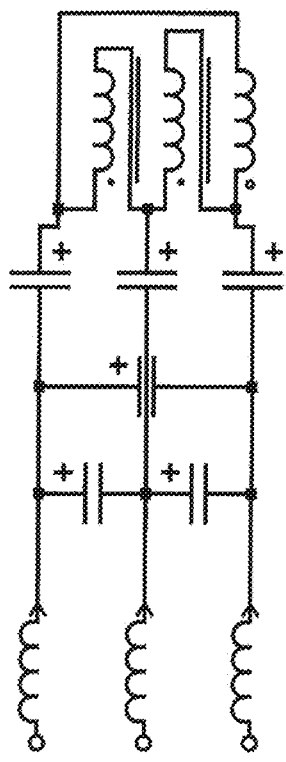
FIGS. 11A-11H illustrate diagrams of eight examples of types of resonant network topologies, where an LCC structure is used as a compensation network in accordance with aspects of the disclosure.
Figure 11B:
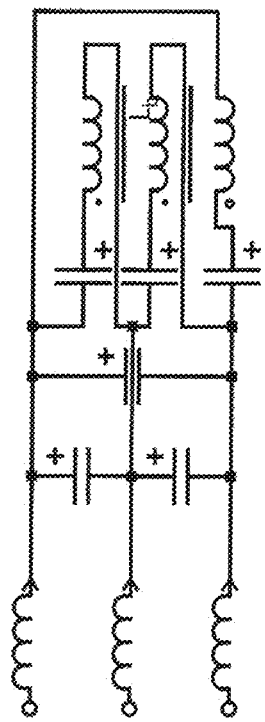
Figure 11C:
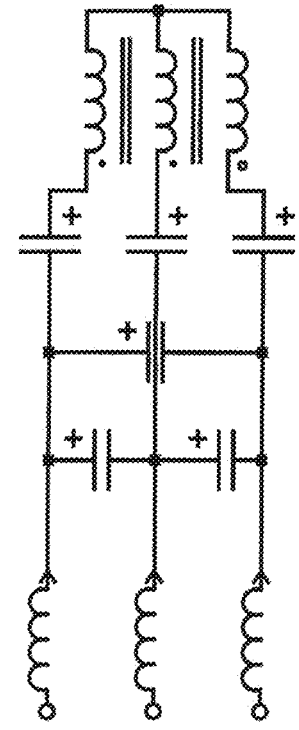
Figure 11D:
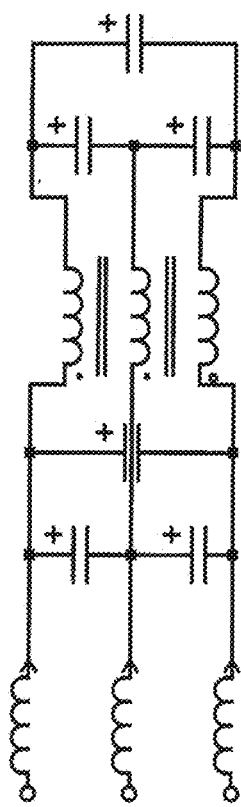
Figure 11F:
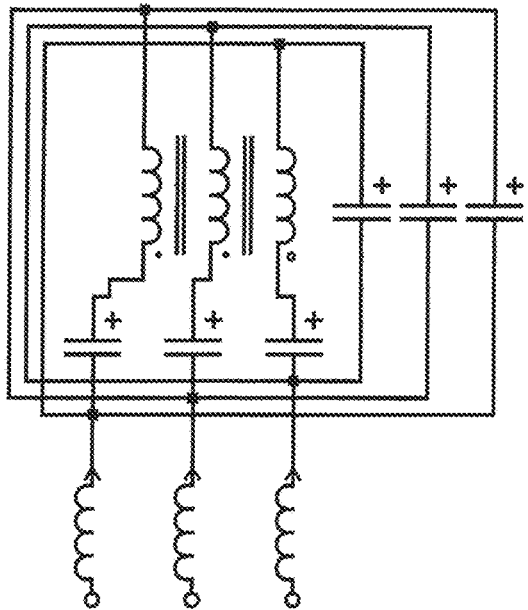
Figure 11E:
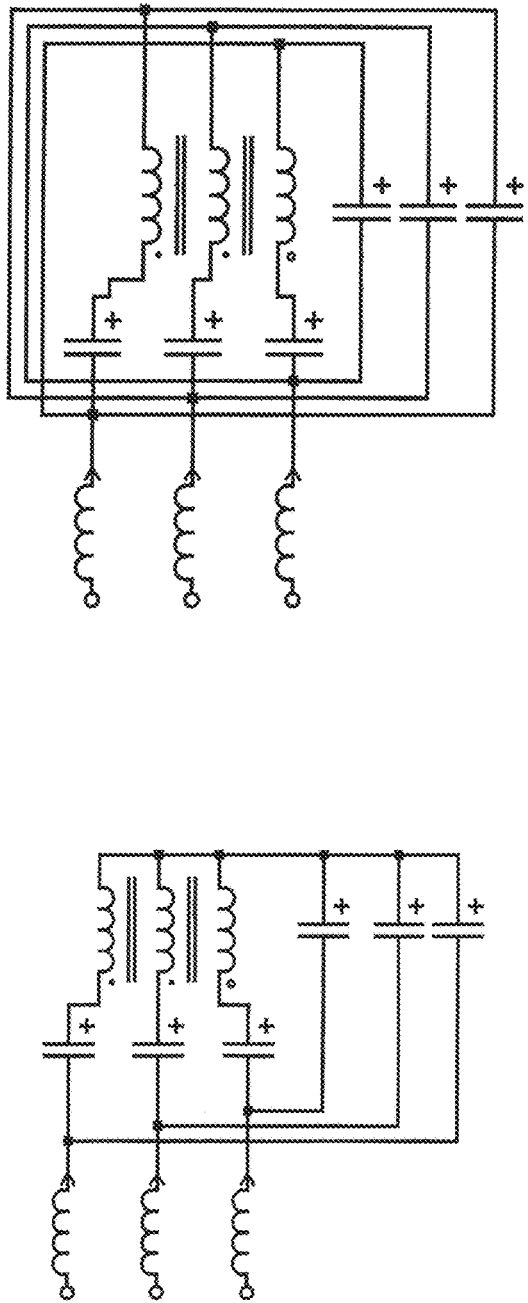
Figure 11H:
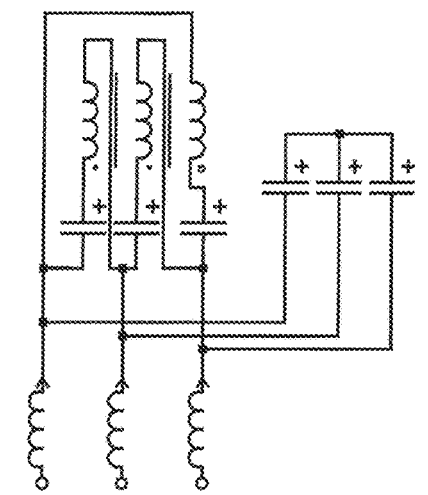
Figure 11G:
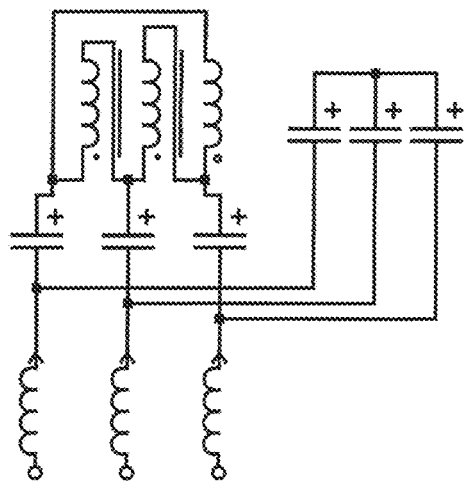

FIG. 12 depicts a schematic diagram of a polyphase wireless power transfer system in accordance with aspects of the disclosure. The input power 5, conversion stage 10 and controller 20 are not shown in FIG. 12. Additionally, the receiver controller 120 and the load are also not shown. The receiver controller 120 controls the inverter 115, e.g., gate driver. The coil assembly 25 in FIG. 12 is unipolar. The coil assembly is represented in FIG. 12 as three inductors. The inductors L are connected in a wye configuration (YL). While the inductors are labeled L in the figure, the inductance of each may be different. The compensation network 30 comprises series capacitance (Cp). Although the capacitance in each phase is referred to in FIG. 12 as Cp, the values of the capacitance may be different depending on the number of layers in the assembly 25 and the values may be different based on equations 13 or 14 depending on the balance of the self and mutual inductance. FIG. 12 depicts one compensation network and inductor configuration, however, other configurations such as depicted in FIG. 11A and FIG. 11E may be used.

The polyphase inverter 15 comprises a plurality of switching elements S1-S6. These switching elements are switching pairs. One switching pair for a respective phase. For example, switching elements S1 and S2 are for phase a, switching elements S3 and S4 are for phase b and switching elements S5 and 6 are for phase c. The polyphase inverter 15 also comprises switching elements S7 and S8 (additional switching pair). These switching elements S7 and S8 are to configure the transmitter for different receivers. Switching elements S1-S6 may also be controlled to allow for power transfer to different receivers.

The transmitter may have an inductor Ln connected to the neutrals N and to a node n between the switching elements S7 and S8.

The switching elements in each pair (S1-S6) may be complementary. For example, when switching element S1 is turned ON, switching element S2 (same pair) is turned OFF. The space vector hexagon in FIG. 36 describes the 8 combinations of switch states. For example, state V1 with switch states (100) means that the S1 is ON and S2 is off, S3 is OFF and S4 is ON, and S5 is OFF and S6 is ON.

Figure 36:
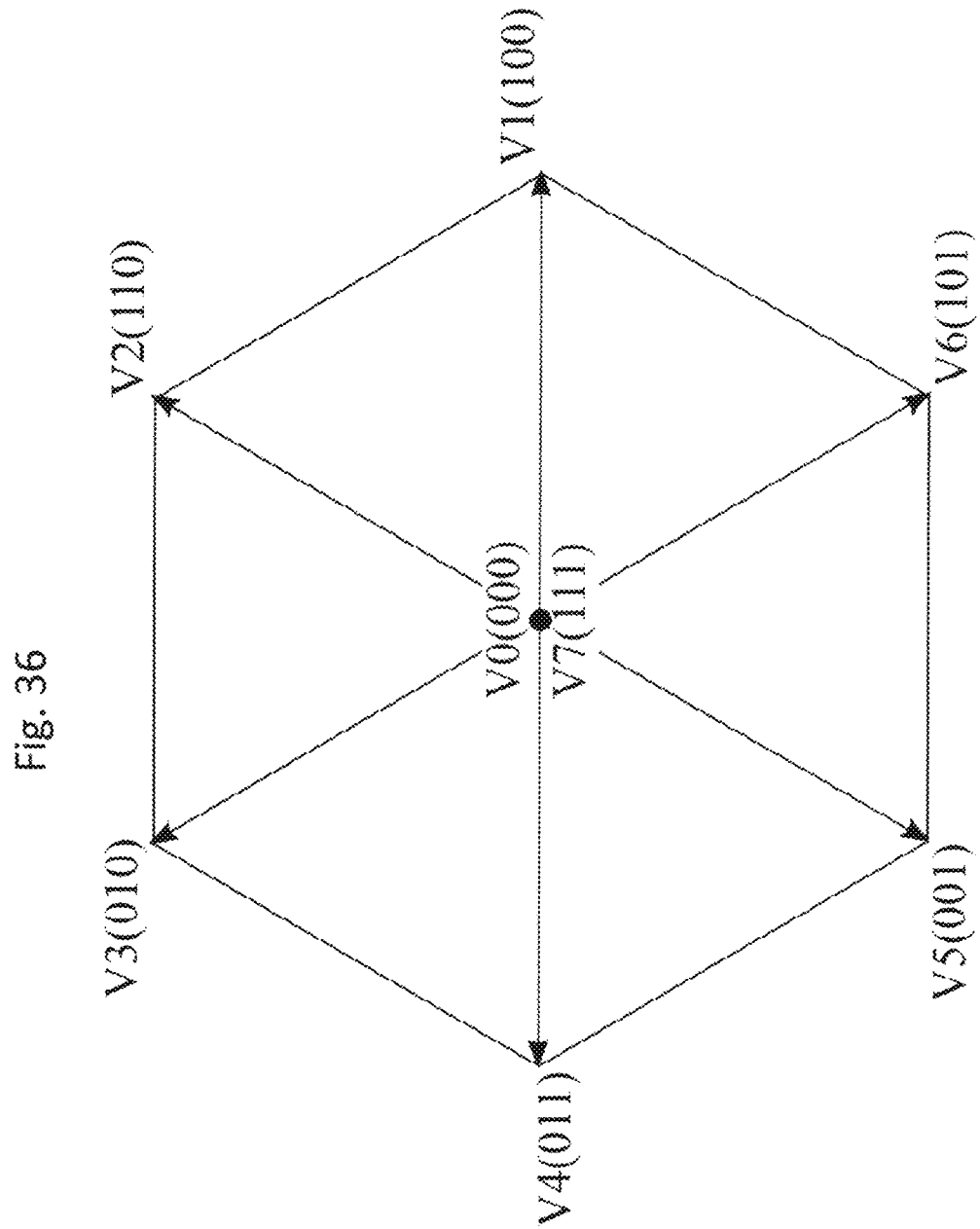
FIG. 36 illustrates a space vector voltage hexagon.

Control of a three-phase inverter (such as inverter 15) may be accomplished by visiting states V1, V2, V3, V4, V5, and V6 in the space-vector voltage hexagon in FIG. 36 in either a counterclockwise or clockwise manner over one time period associated with the operating frequency. The zero states V0 and V7 represented at the center of the hexagon may visited between states V1 through V6. A general switching scheme may be V1-(V0 or V7)-V2-(V0 or V7)-V3-(V0 or V7)-V4-(V0 or V7)-V5-(V0 or V7)-V6. The times spent in any group of states could be equal or different. The times spent in any of the states could be zero, so that the state is skipped. The times spent in any of the states can be adjusted to control the power transferred to the receiver. The times spent in any of the states can be adjusted based on the type of receiver as described below. The times spent in any of the states can also be adjusted based on the degree of rotational misalignment between the transmitter and receiver as described below. The times spent in any of the states can also be adjusted based on the degree and direction of translational misalignment between the transmitter and receiver as described below. In an aspect of the disclosure, only the type of receiver, only the rotational misalignment or only translational misalignment may be used to adjust the times spent in any of the states. In other aspects, any combination of two or more of the type of receiver, rotational misalignment and translational misalignment may be used. For example, all three of the type of receiver, rotational misalignment and translational misalignment may be used. For example, the type of receiver and rotational misalignment or the type of receiver and translational misalignment may be used. In another example, the rotational and translational misalignment may be used.

As depicted in FIG. 12, the receiver is a three-phase receiver. The coil assembly 125 of the receiver is represented in FIG. 12 with three inductors $L_r$. An advantage of the disclosed transmitter is that the coil assembly 25 in the transmitter and the coil assembly 125 in the receiver does not need to be the same. The inductance may or may not be the same as the inductance of the transmitter coils. While the inductors $L_r$ are depicted in a wye configuration YL, the inductors in the receiver may have Δ configuration. The compensation network 130 is depicted in FIG. 12 as series capacitance Cs. The value of the capacitance is determined in the same manner as described above. FIG. 12 also depicts an inverter 115 in the receiver. As depicted, the inverter 115 has three pairs of switching elements, $S_r$, which correspond to the three-phases. This allows for bi-directional power transfer. However, in other aspects of the disclosure, the inverter 115 may be replaced with a rectifier where bi-directional power transfer is not needed.

In an aspect of the disclosure, the system 1 may use wireless communication to transmit information regarding the receiver configuration. For example, the receiver side and the transmission side may include a wireless interface. The wireless interface may be WIFI. In other aspects of the disclosure, the interface may be a near field communication interface such as a BLE interface. In other aspects, the receiver may comprise an RFID tag and the transmitter may include an RFID reader. The reader may interrogate the RFID tag. The RFID tag may contain the receiver configuration. The RFID tag may, in response to the interrogation, transmit the receiver configuration.

In other aspects of the disclosure, the type of receiver may be determined by applying test switching waveforms. In this aspect of the disclosure, the controller 20 will cycle through a plurality of excitation modes and detect electrical properties. The electrical properties may comprise transmitting coils currents, e.g., inductor currents and inverter currents. The currents may be detected via current sensors (not shown). The current sensors may be hall-effect current sensors. In other aspects, the current sensors may use sense resistors and shunt sensing circuits. The controller 20 also comprises a memory. This memory may store a look up table for the electrical properties associated with a type. Different types of receivers may cause different electrical properties in the transmitter (coil and inverter). The different electrical properties may be used to discriminate the type of receiver. Each mode, such as, but not limited to, α-mode, β-mode and γ-mode may be excited for a preset period of time in order to measure the electrical properties. The measured electrical proprieties may be stored. The controller 20 may use any order of excitation.

In some aspects of the disclosure, the memory may also have the different electrical properties associated with the types for different translational and rotational alignments.

The following describes an example of the determination of the receiver type in accordance with aspects of the disclosure. The controller 20 may enter a test switching mode in response to a command such as a notification from a camera. In other aspects, a wireless interface in the receiver may transmit a notification to the transmitter (wireless interface). This notification may include the amount of power needed for charging and indicate presence at the charger. In response, the controller 20 causes a first excitation mode to be excited. For example, the controller 20 controls the switching elements in the inverter 15 to cause the first excitation mode to be excited. For purposes of the description, this mode may be the α-mode. The controller 20 subsequently receives the detected currents, e.g., inverter and coils. The controller 20 may wait a set period of time to record the current to allow for the system to reach a steady-state. The controller repeats this process for the second excitation mode and a third excitation mode. For purposes of the description, these modes may be the β-mode and γ-mode. Additional modes may be excited depending on the coil assembly configuration. Additionally, both the α-mode and β-mode may be excited at the same time.

Once the test excitation modes are completed. The controller 20 may compare the measured and recorded currents with the prestored currents (for both the inverter and coils) in the look up table. The type of receiver that has the prestored currents match the measured currents for the test modes, is determined as the type of receiver. Matching for the determination includes the type having the prestored values be the closest to the measured values.

After the controller 20 determines the type of receiver as described above, the controller 20 may control the inverter 15 based on the determined type such as described below.

The transmitter in FIG. 12 may be used to transfer power to different receivers such as a three-phase, a single phase DD or a single phase circular (as described above, the single phase receiver may have a different configuration such as square, hexagonal, etc.)

Figure 13:
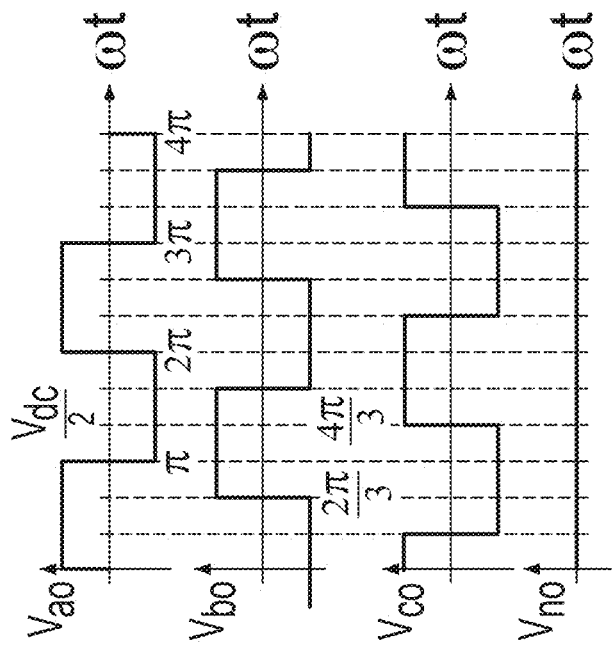
FIG. 13 illustrating a timing diagram showing the inverter control for the transmitter in FIG. 12 transferring power to the receiver in FIG. 12, in accordance with aspects of the disclosure.

FIG. 13 illustrates an example of a transmitter inverter control for power transfer to a receiver having three-phases, e.g., three-phase operation. In FIG. 13, the switching period is T. The voltage $V_{ao}$ represents the voltage at node a; $V_{bo}$ represents the voltage at node b; and $V_{vo}$ represents the voltage at node c.

The voltage cycles from + to − and vice versa. For example, the positive voltage reflects when switching element S1 is ON (S2 OFF) and the negative voltage reflects when switching element S2 is ON (S1 OFF). For example, between 0 and π, S1 is ON and S2 is OFF and at & S1 is switched OFF and S2 is switched on. For the three-phase operation, the switching time is offset for the respective switching pairs. This is reflected in the shift in the voltage square waves at $V_{ao}$, $V_{bo}$ and $V_{co}$. In an aspect of the disclosure, in the three-phase operation, the shift is (⅔) π. Switching elements S1 and S2 are operated at different times from switching elements S3 and S4, which are also operated at different times from switching elements S5 and S6.

Also for the three-phase operation, switching elements S7 and S8 are maintained OFF, as reflected in the flat line for the voltage $V_{no}$, which is the voltage at node n. FIG. 13 depicts the switching timing for a quadrature phase shift in the α-mode and the β-mode, however, other phases shifts may be used. A quadrature phase shift may be used when the transmitting coils and the receiving coils are aligned with respect to each other. In accordance with aspects of the disclosure, the control of the switching elements may be based on a translational (not aligned) state between the transmitting coils and the receiving coils. For example, the controller may change the time spent in each switching state (states are shown in FIG. 36) based on the translation. For example, if the transmitting coils and the receiving coils are translated in the x-axis, the controller 20 may control the switching to spend more time in state V1 and V4, whereas if the transmitting coils and the receiving coils are translated in the y-axis, the controller 20 may control the switching to spend more time in states V2, V3, V5 and V6.

In an aspect of the disclosure, misalignment (translational and rotational) may be transmitted from the receiver to the transmitter via the wireless interface. In other aspects of the disclosure, the system 1 may also have a camera. The camera may be optical or infrared. In this aspect of the disclosure, the camera may detect a misalignment (both translational and rotational) and notify the controller 20 of such a condition. The controller 20 may control the switching elements based on the notification. The notification may include the amount of misalignment (translational and rotational) and the time spent at the states or which states may be based on the amount of the misalignment.

In other aspects of the disclosure, the alignment (translational and rotational) may be determined using the look up table in a similar manner as described above. For example, the controller 20 may compare the measured currents for the plurality of excitation modes with the prestored currents under different known alignment conditions (translational and rotational) (for the different types). The alignment condition that has the prestored currents match the measured currents for the test modes, is determined as actual alignment condition (translational and rotational). Matching for the determination includes the alignment condition having the prestored values be the closest to the measured values. After the controller 20 determines the alignment condition, the controller 20 may control the inverter 15 based on the determination.

The switching may be controlled via a gate driver (not shown in FIG. 12).

Figure 14:
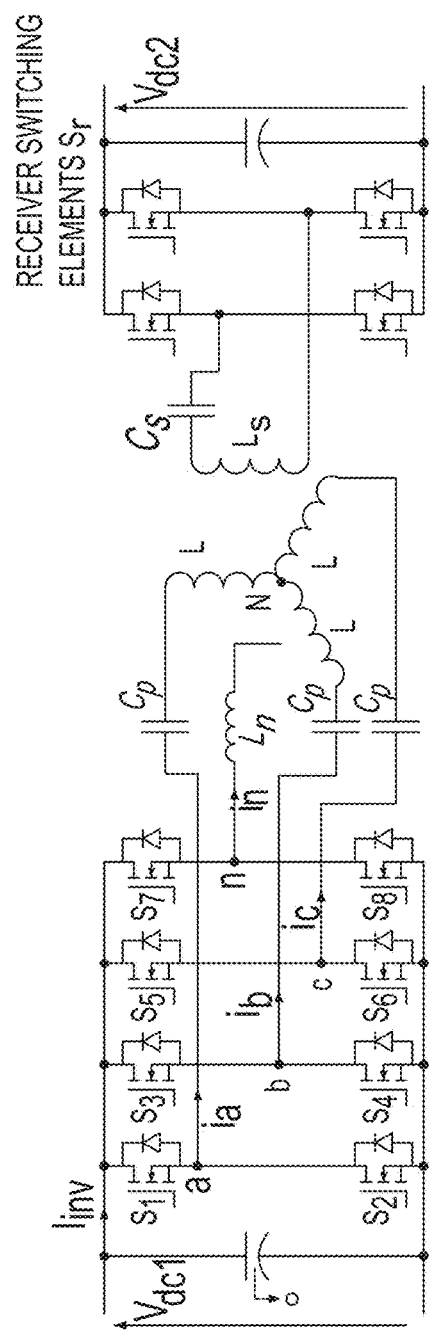
FIG. 14 illustrates a diagram of another wireless power transfer system in accordance with aspects of the disclosure, where a three-phase unipolar transmitter is used and single phase receiver is used.
Figure 15:
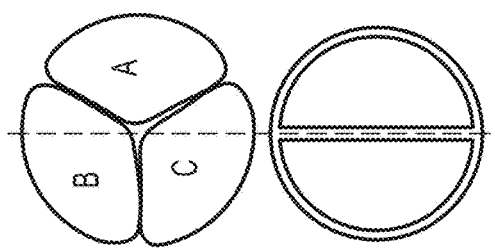
FIG. 15 illustrates a diagram of an example of transmitting coils and receiving coils alignment for the system in FIG. 14.

FIG. 14 depicts the same transmitter, e.g., three-phase unipolar. However, in FIG. 14, the receiver has a single phase, e.g., coils Ls. As shown in FIG. 15, the coils Ls may have a bipolar configuration, e.g., DD. FIG. 15 illustrates an example of the alignment of the three-phases A, B and C of the transmitter with the single phase DD receiver. In the receiver, the inverter 115 may be configured as a H-bridge, one pair of switching elements coupled to one end of the inductor and the other pair of switching elements coupled to the other end.

Figure 16:
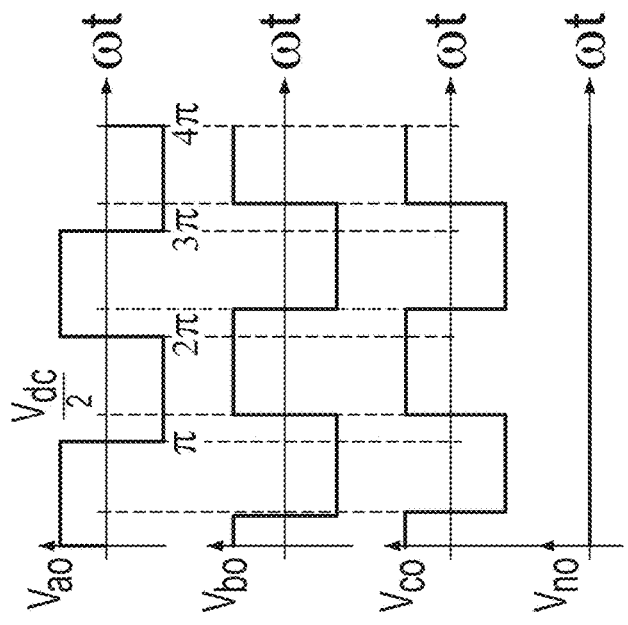
FIG. 16 illustrates a timing diagram showing the inverter control for the transmitter and receiver alignment in FIG. 15 in accordance with aspects of the disclosure.

FIG. 16 illustrates an example of a transmitter inverter control for power transfer to a receiver having a single phase with a DD configuration, e.g., single phase DD operation. In FIG. 16, the switching period is π. The voltage $V_{ao}$ represents the voltage at node a; $V_{bo}$ represents the voltage at node b; and $V_{vo}$ represents the voltage at node c.

Unlike the operation shown in FIG. 13, for the single phase DD operation, two of the phases are switched at the same time when the transmitting coils and the receiving coils are aligned and not rotated. In FIG. 16, phases b and c are switched at the same time. Thus, the inverter 15 operates as a single phase inverter where one leg of the output may be phase A while the other leg is composed of phases b and c. As depicted, the α-mode is excited. Additionally, the switching timing depicted is when the transmitting coils and the receiving coils are aligned and not rotated with respect to each other. For example, when aligned and not rotated, the switching states may be V7-V1-V0-V4. Also for the single phase DD operation, switching elements S7 and S8 are maintained OFF as reflected in the flat line for the voltage $V_{no}$, which is the voltage at node n. When the transmitting coils and the receiving coils are rotated with respect to each other, the controller 20 may change the switching timing (states). In an aspect of the disclosure, the switching states may depend on the amount of the rotation. For example, for 60° rotation, both the α-mode and the β mode may be excited. The switching states may be V5-V7-V2-V0. In another example, for a 90° rotation, the β mode may be excited. States V1 and V4 may be omitted. Additionally, when the transmitting coils and the receiving coils are translated with respect to each other, the controller 20 may change the switching timing (states). In an aspect of the disclosure, the switching states may depend on the direction and magnitude of the translation. For example, for a translation along the x-axis, both the α-mode and the β mode may be excited. The switching states may be V1-V2-V3-V4-V5-V6. In another example, for translation along a vector oriented 30° from the x-axis, the switching states may be V1-V2-V4-V5, with states V3 and V6 omitted.

Figure 17:
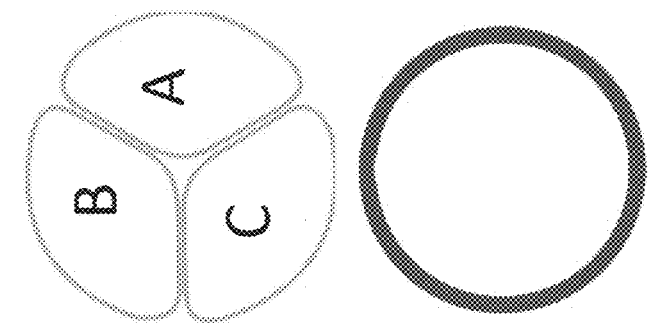
FIG. 17 illustrates a diagram of another example of transmitting coils and receiving coil alignment for the system in FIG. 14.

The receiver in FIG. 14 may also have a circular coil configuration, e.g., unipolar. FIG. 17 depicts the transmitter and receiver coil alignment for the circular receiver coil configuration. The circular coil aligns with the three-phases A, B and C.

Figure 18:
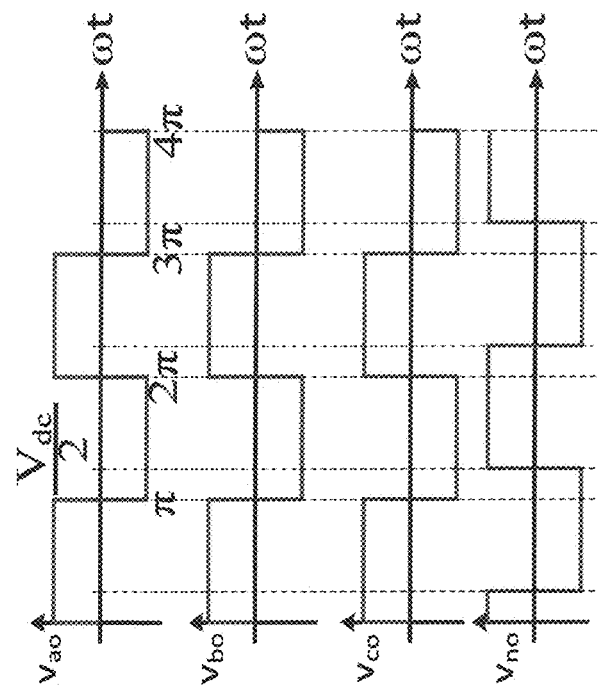
FIG. 18 illustrates a timing diagram showing the inverter control for the transmitter and receiver alignment in FIG. 17 in accordance with aspects of the disclosure.

FIG. 18 illustrates an example of a transmitter inverter control for power transfer to a receiver having a single phase with a circular configuration, e.g., single phase circular operation. In FIG. 18, the switching period is π. The voltage $V_{ao}$ represents the voltage at node a; $V_{bo}$ represents the voltage at node b; $V_{vo}$ represents the voltage at node c; and $V_{no}$ represents the voltage at node m.

Unlike the three-phase operation and the single phase DD operation, for the single phase circular operation, switching elements S7 and S8 are switched. Additionally, the switching element pairs S1-S6 for each phase are switched at the same time. S1, S3 and S5 are switched at the same time and S2, S4 and S6 are switched at the same time. As depicted in FIG. 18, the positive voltage at node n occurs when switching element S7 is turned ON (and S8 is turned OFF) and the negative voltage at n occurs when the switching element S8 is turned ON (and S7 is turned OFF).

As depicted in FIG. 18, a γ-mode is excited. This may occur when the transmitting coils and the receiving coils are aligned (not translated). The switching states include V0 and V7. As depicted in FIG. 18, the timing when the switching elements S7 and S8 are controlled is offset from the timing when the switching elements S1-S6 are controlled, e.g., switched. The relative timing of the switching may be adjusted to control the duty cycle. The closer of the relative switching timing reduces the duty cycle. In some aspects, when the transmitting coils and the receiving coils are not aligned, the switching states may be changed, e.g., the controller changes the switching such that other modes may be excited. For example, for translational misalignment along a vector oriented at 30° from the x-axis, the switches may use states V1-V2-V5-V6.

Figure 19:
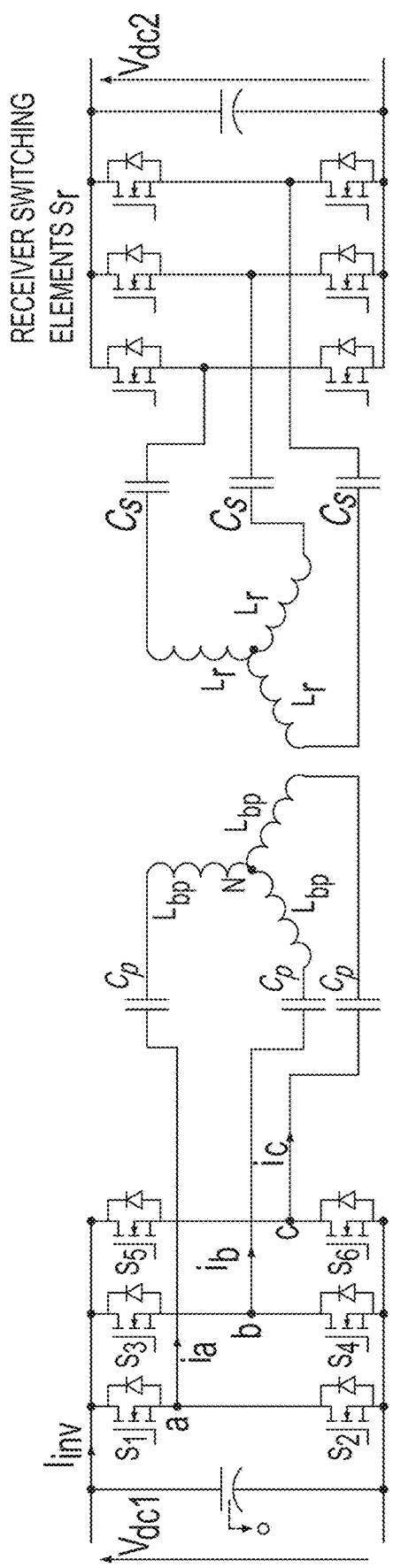
FIG. 19 illustrates a diagram of another wireless power transfer system in accordance with aspects of the disclosure, where a three-phase bipolar transmitter is used and a three-phase receiver is used.

FIG. 19 depicts a schematic diagram of another polyphase wireless power transfer system in accordance with aspects of the disclosure. The input power 5, conversion stage 10 and controllers 20 and 120 and load 140 are not shown in FIG. 19. The coil assembly 25 in FIG. 19 is bipolar (referred as $L_{bp}$ in FIG. 19). In FIG. 19, the inductors are labeled $L_{bp}$, however, each inductor may have a different inductance. The inverter 15 in FIG. 19 is similar to the inverter 15 in FIG. 12 except that switching elements S7 and S8 are removed.

Inductor Ln is also not included in the transmitter in FIG. 19.

The inductors are connected in a wye configuration (YL). The compensation network 30 comprises series capacitance (Cp). While FIG. 19 depicts a YC-YL configuration, any of the resonant networks described herein may be used (see FIG. 10A-10D, 11A-11H). Although each is referred in FIG. 19 as Cp, the values of the capacitance may be different depending on the number of layers in the assembly and the values may be different based on equations 13 or 14 depending on the balance of the self inductance and mutual inductance. The coil assembly 25 may have the configurations as depicted in FIGS. 2A-4B.

The switching elements S1-S6 may be the same as discussed above in FIG. 12 and may be controlled by a gate driver.

The transmitter may transfer power to a three-phase receiver or a single phase DD configured receiver. The receiver in FIG. 19 is a three-phase receiver and the receiver in FIG. 21 is a single phase DD configured receiver.

Figure 20:
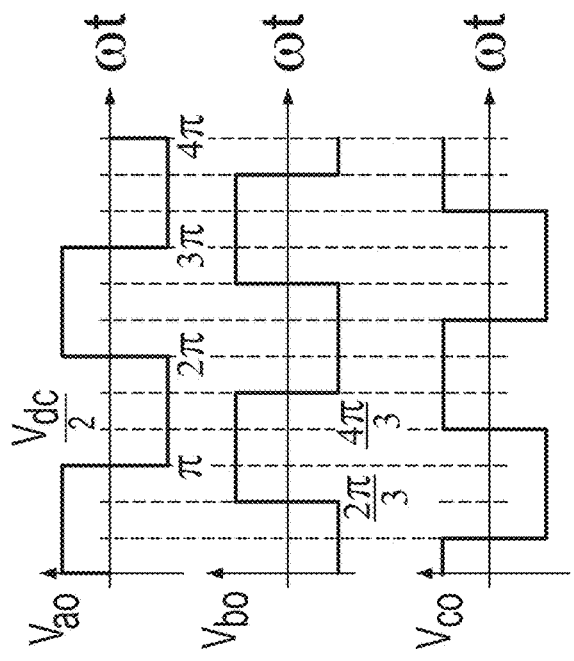
FIG. 20 illustrates a timing diagram showing the inverter control for the transmitter in FIG. 19 transferring power to the receiver in FIG. 19, in accordance with aspects of the disclosure.

FIG. 20 illustrates an example of a transmitter inverter control for power transfer to a receiver having three-phases, e.g., three-phase operation, for the transmitter in FIG. 19. In FIG. 20, the switching period is π. The voltage $V_{ao}$ represents the voltage at node a; $V_{bo}$ represents the voltage at node b; and $V_{vo}$ represents the voltage at node c.

The timing of switching the switching elements S1-S6 is the same in FIG. 20 as in FIG. 13. For example, for the three-phase operation, the switching time is offset for the respective switching pairs. This is reflected in the shift in the voltage square waves at $V_{ao}$, $V_{bo}$ and $V_{co}$. FIG. 20 depicts the switching timing for a quadrature phase shift in the α-mode and the β-mode, however, other phases shifts may be used. A quadrature phase shift may be used when the transmitting coils and the receiving coils are aligned with respect to each other. In accordance with aspects of the disclosure, the control of the switching elements may be based on a translational (not aligned) state between the transmitting coils and the receiving coils. For example, the controller 20 may change the time spent in each switching state (states are shown in FIG. 36) based on the translation. For example, if the transmitting coils and the receiving coils are translated in the x-axis, the controller may control the switching to spend more time in state V1 and V4, whereas if the transmitting coils and the receiving coils are translated in the y-axis, the controller 20 may control the switching to spend more time in states V2, V3, V5 and V6.

Figure 21:
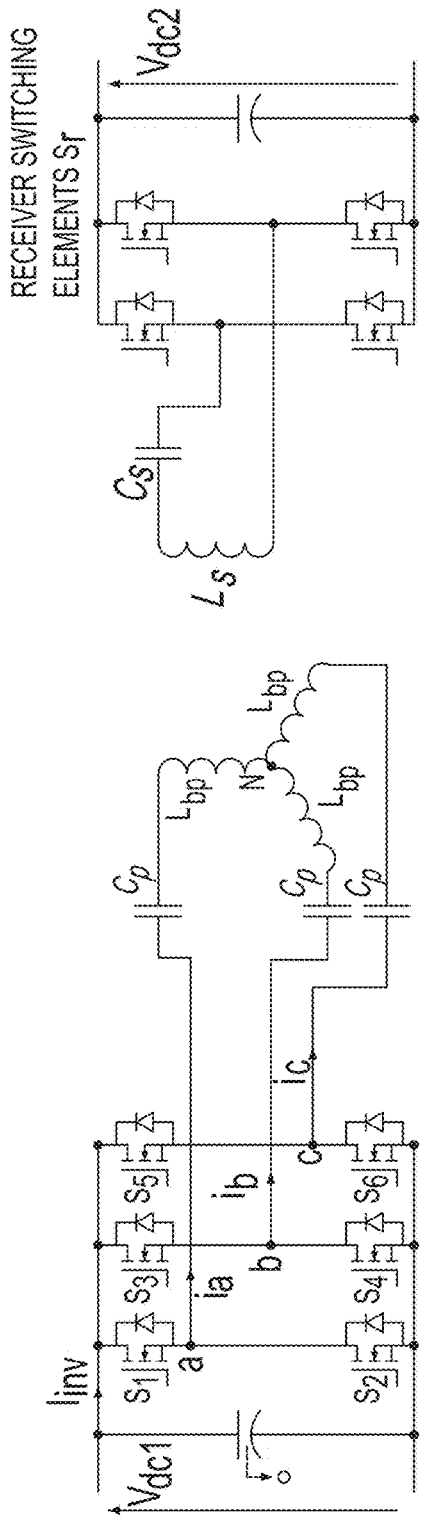
FIG. 21 illustrates a diagram of another wireless power transfer system in accordance with aspects of the disclosure, where a three-phase bipolar transmitter is used and single phase receiver is used.
Figure 22:
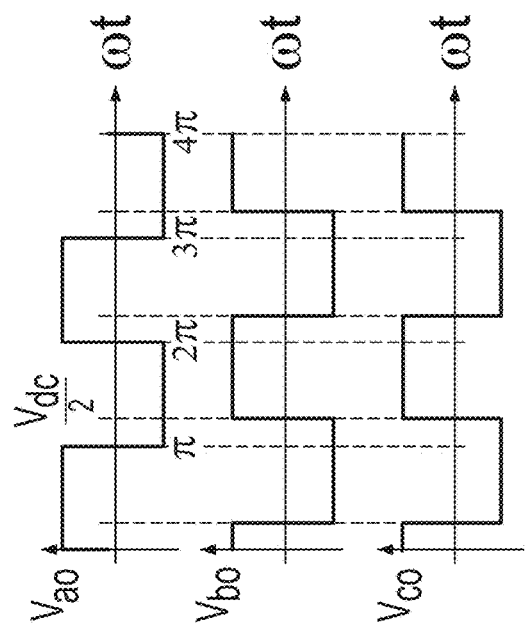
FIG. 22 illustrates a timing diagram showing the inverter control for the transmitter in FIG. 21 accordance with aspects of the disclosure where the receiving coils have a DD arrangement.

FIG. 22 illustrates an example of a transmitter inverter control for power transfer to a receiver having a single phase DD configuration, e.g., single phase DD operation, for the transmitter in FIG. 21. While FIG. 21 depicts a YC-YL configuration, any of the resonant networks described herein may be used (see FIG. 10A-10D, 11A-11H). In FIG. 22, the switching period is π. The voltage $V_{ao}$ represents the voltage at node a; $V_{bo}$ represents the voltage at node b; and $V_{vo}$ represents the voltage at node c.

The timing of switching the switching elements S1-S6 is the same in FIG. 22 as in FIG. 16. For example, for the single phase DD operation, two of the phases are switched at the same time when the transmitting coil and the receiving coils are aligned and not rotated. In FIG. 22, phases b and c are switched at the same time. Thus, the inverter operates as a single phase inverter where one leg of the output may be phase A while the other leg is composed of phases b and c. As depicted, the α-mode is excited. Additionally, the switching timing depicted is when the transmitting coils and the receiving coils are aligned and not rotated with respect to each other. For example, when aligned and not rotated, the switching states may be V7-V1-V0-V4.

When the transmitting coils and the receiving coils are rotated with respect to each other, the controller 20 may change the switching timing (states). In an aspect of the disclosure, the switching states may depend on the amount of the rotation. For example, for 60° rotation, both the α-mode and the β mode may be excited. The switching states may be V5-V7-V2-V0. In another example, for a 90° rotation, the β mode may be excited. States V1 and V4 may be omitted. Additionally, when the transmitting coils and the receiving coils are translated with respect to each other, the controller 20 may change the switching timing (states). In an aspect of the disclosure, the switching states may depend on the direction and magnitude of the translation. For example, for a translation along the x-axis, both he α-mode and the β mode may be excited. The switching states may be V1-V2-V3-V4-V5-V6. In another example, for translation along a vector oriented 30° from the x-axis, the switching states may be V1-V2-V4-V5, with states V3 and V6 omitted.

FIG. 23 depicts a schematic diagram of another polyphase wireless power transfer system in accordance with aspects of the disclosure. As with the other figures, e.g. FIGS. 12, 14, 19, and 21, the input power 5, conversion stage 10 and controllers 20 and 120 and load 40 are not shown in FIG. 23.

The transmitter in FIG. 23 is compatible with receivers having three-phases, a single phase with DD configuration and a single phase circular configuration.

In FIG. 23, the transmitter is bipolar similar to the transmitter in FIGS. 19 and 21 (three-phase). However, a difference in the transmitter in FIG. 23 and FIGS. 19 and 21, is that coils having different polarities are connected to different switching elements. In FIG. 23, coils of a first polarity, e.g., positive, are represented as A+, B+ and C+ and coils of the opposite polarity, e.g., negative, are represented as A−, B− and C−. Coils of each polarity are connected to the inverter 15 in a similar manner as described in FIG. 12. The coils of the different phases may or may not have the same inductance. Coils of the same phase may or may not have the same inductance. FIG. 23 depicts one compensation network and inductor configuration, however, other configurations such as depicted in FIG. 11A and FIG. 11E may be used.

For example, a first pair of switching elements S1 and S2 are connected to the positive phase A+ and a second pair of switching elements S1 and S2 are connected to the negative phase A−. A first pair of switching elements S3 and S4 are connected to the positive phase B+ and a second pair of switching elements S3 and S4 are connected to the negative phase B−. Similarly, a first pair of switching elements S5 and S6 are connected to the positive phase C+ and a second pair of switching elements S5 and S6 are connected to the negative phase C−. The connections to the positive phase component, A+, B+ and C+ and the negative phase component, A−, B− and C− are similar to FIG. 12 for the unipolar aspects of the disclosure.

Node A+(A+0) is between a first pair of switching elements S1 and S2 and node A− (a-o) is between the second pair of switching elements S1 and S2. Node B+(B+0) is between a first pair of switching elements S3 and S4 and node B− (B-o) is between the second pair of switching elements S3 and S4. Node C+(C+0) is between a first pair of switching elements S5 and S6 and node C− (C-o) is between the second pair of switching elements S5 and S6.

Also like in FIG. 12, there may be an inductance $L_n$ between the neutral N and the respective node n+ or n−.

The polyphase inverter 15 also comprises first and second pairs of switching elements S7 and S8 (additional switching pairs). These switching elements S7 and S8 are to configure the transmitter for the different receivers. One pair of switching element S7 and S8 are coupled to node n+ and the other is coupled to n−. Switching elements pairs S1-S6 may also be controlled to allow for power transfer to the different receivers.

As depicted in FIG. 23, the receiver has three-phases similar to the receiver in FIG. 12.

Figure 24:
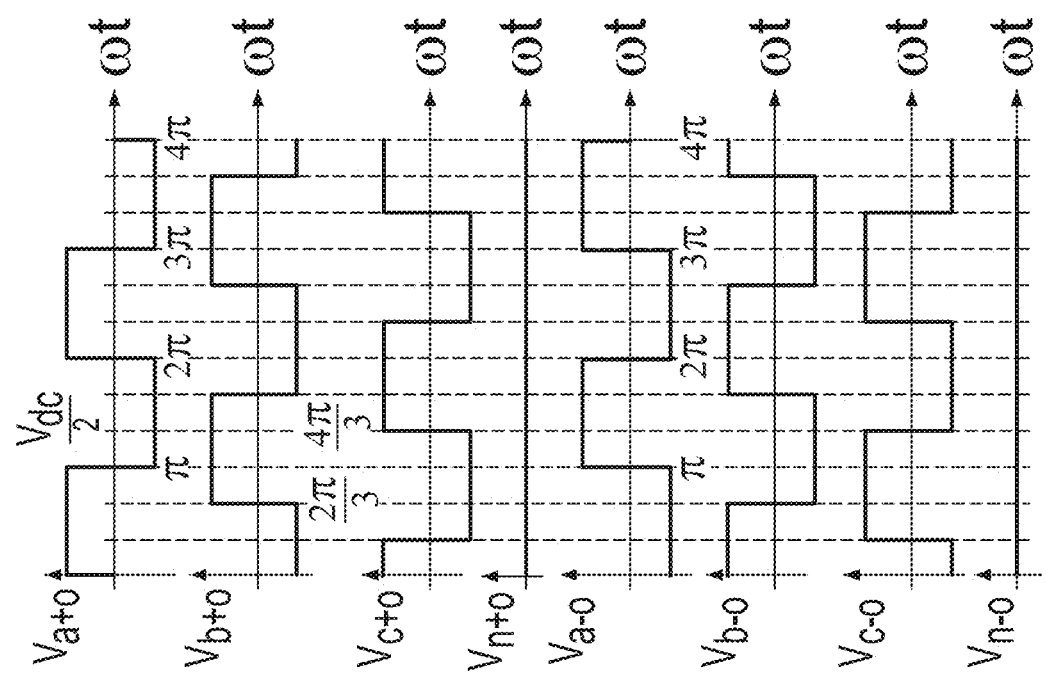
FIG. 24 illustrates a timing diagram showing the inverter control for the transmitter in FIG. 23 accordance with aspects of the disclosure.

FIG. 24 illustrates an example of a transmitter inverter control for power transfer to a receiver having a three-phase configuration, e.g., three-phase operation, for the transmitter in FIG. 23. In FIG. 24, the switching period is π. As shown in FIG. 24, the node A+ and node A− have opposite relationships, e.g., A+ being positive when A− is negative and vice versa. Similarly, the node B+ and node B− have opposite relationships, e.g., B+ being positive when B− is negative and vice versa and the node C+ and node C− have opposite relationships, e.g., C+ being positive when C− is negative and vice versa.

As in FIG. 12, the timing for the different phases to be switched is different, e.g. staggered, such that different square waves for the different phases are offset. Switching elements pairs S1 and S2 are operated at different times from switching elements pairs S3 and S4, which are also operated at different times from switching elements pairs S5 and S6.

FIG. 24 depicts the switching timing for a quadrature phase shift in the α-mode and the β-mode, however, other phases shifts may be used. A quadrature phase shift may be used when the transmitting coils and the receiving coils are aligned with respect to each other. In accordance with aspects of the disclosure, the control of the switching elements may be based on a translational (not aligned) state between the transmitting coils and the receiving coils. For example, the controller 20 may change the time spent in each switching state (states are shown in FIG. 36) based on the translation. For example, if the transmitting coils and the receiving coils are translated in the x-axis, the controller 20 may control the switching to spend more time in state V1 and V4, whereas if the transmitting coils and the receiving coils are translated in the y-axis, the controller 20 may control the switching to spend more time in states V2, V3, V5 and V6.

Switching elements for the same phase may be operated at the same time. For example, switching element S1 coupled to A+ is operated at the same time as switching element S1 coupled to A−. However, the relationship may be complementary.

Also for the three-phase operation, switching elements pair S7 and S8 are maintained OFF as reflected in the flat line for the voltage $V_{n+o}$ and $V_{n-o}$.

Figure 25:
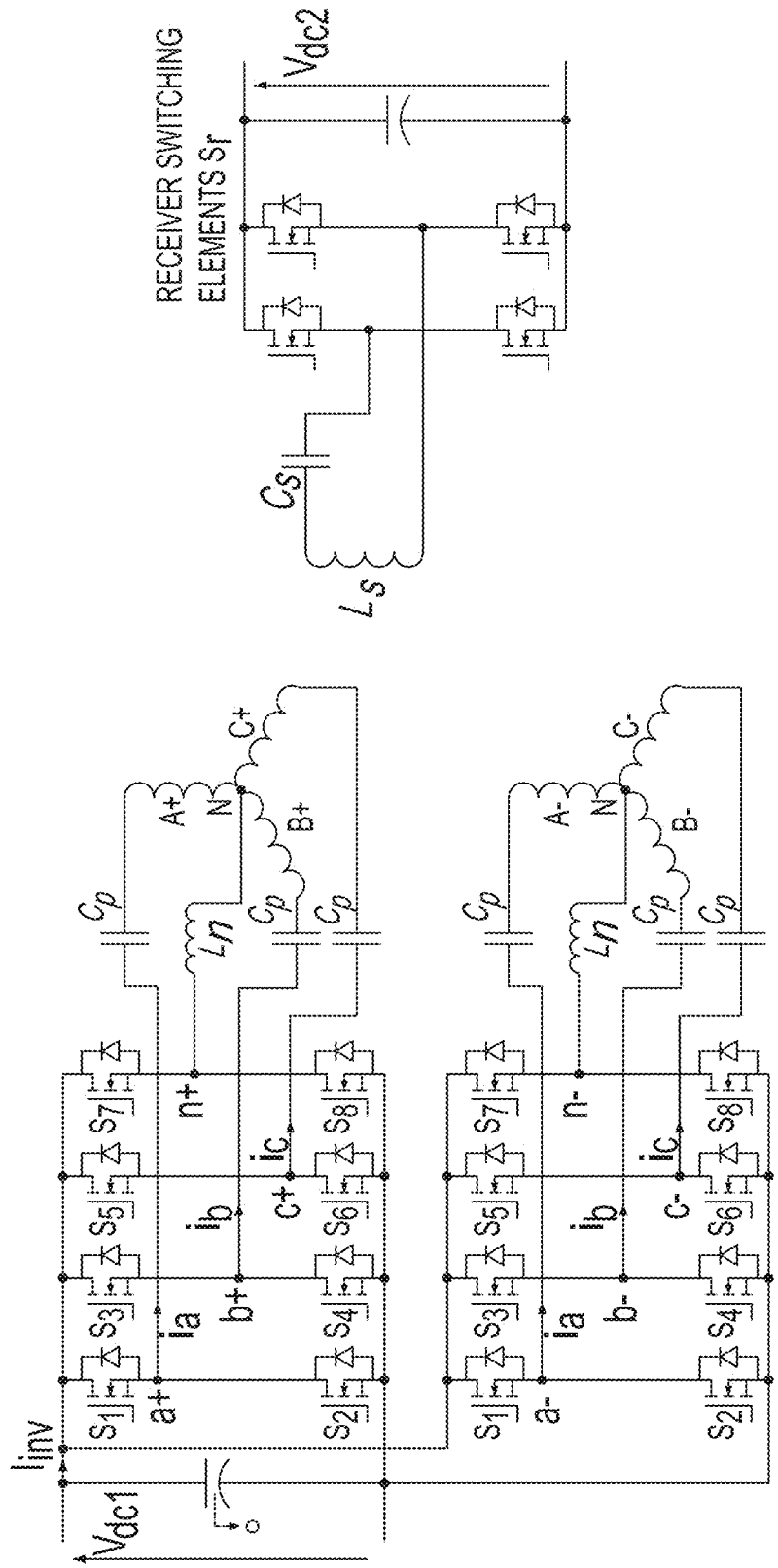
FIG. 25 illustrates a diagram of another wireless power transfer system in accordance with aspects of the disclosure, where a three-phase bipolar transmitter is used and single phase receiver is used.

FIG. 25 depicts the same transmitter, e.g., three-phase bipolar. However, in FIG. 25, the receiver has a single phase, e.g., coils Ls. FIG. 26 illustrates an example of a transmitter inverter control for power transfer to a receiver having a single phase with a DD configuration, e.g., single phase DD operation. In FIG. 26, the switching period is T.

For the single phase DD operation, two of the phases are switched at the same time. In FIG. 26, phases B+ and B− and C+ and C− are switched at the same time when the transmitting coil and the receiving coils are aligned and not rotated. Thus, the inverter 15 operates as a single phase inverter where one leg of the output may be phase A+/A− while the other leg is composed of phases B+− and C+−. Also for the single phase DD operation, switching elements pairs S7 and S8 are maintained OFF as reflected in the flat line for the voltage $V_{n+o}$ and $V_{n-o}$. As depicted, the α-mode is excited. Additionally, the switching timing depicted is when the transmitting coils and the receiving coils are aligned and not rotated with respect to each other. For example, when aligned and not rotated, the switching states may be V7-V1-V0-V4.

When the transmitting coils and the receiving coils are rotated with respect to each other, the controller may change the switching timing (states). In an aspect of the disclosure, the switching states may depend on the amount of the rotation. For example, for 60° rotation, both the α-mode and the β mode may be excited. The switching states may be V5-V7-V2-V0. In another example, for a 90° rotation, the β mode may be excited. States V1 and V4 may be omitted. Additionally, when the transmitting coils and the receiving coils are translated with respect to each other, the controller 20 may change the switching timing (states). In an aspect of the disclosure, the switching states may depend on the direction and magnitude of the translation. For example, for a translation along the x-axis, both he α-mode and the β mode may be excited. The switching states may be V1-V2-

V3-V4-V5-V6. In another example, for translation along a vector oriented 30° from the x-axis, the switching states may be V1-V2-V4-V5, with states V3 and V6 omitted.

For the single phase circular operation, switching elements pair S7 and S8 are switched. Additionally, the switching element pairs for each phase are switched at the same time when the transmitting coils and the receiving coil are aligned and not translated. Switching element pairs S1, S3 and S5 are switched at the same time as switching element pairs S2, S4 and S6 are switched at the same time. As depicted in FIG. 27, the positive voltage at node n+ occurs when one of the switching element pairs S7 is turned ON (and the other is turned OFF) and the negative voltage at n− occurs when the opposite occurs.

As depicted in FIG. 18, a γ-mode is excited. This may occur when the transmitting coils and the receiving coils are aligned (not translated). The switching states include V0 and V7. In some aspects, when the transmitting coils and the receiving coils are not aligned, the switching states may be changed, e.g., the controller changes the switching such that other modes may be excited. For example, for translational misalignment along a vector oriented at 30° from the x-axis, the switches may use states V1-V2-V5-V6.

Testing and Simulation

Figure 28:
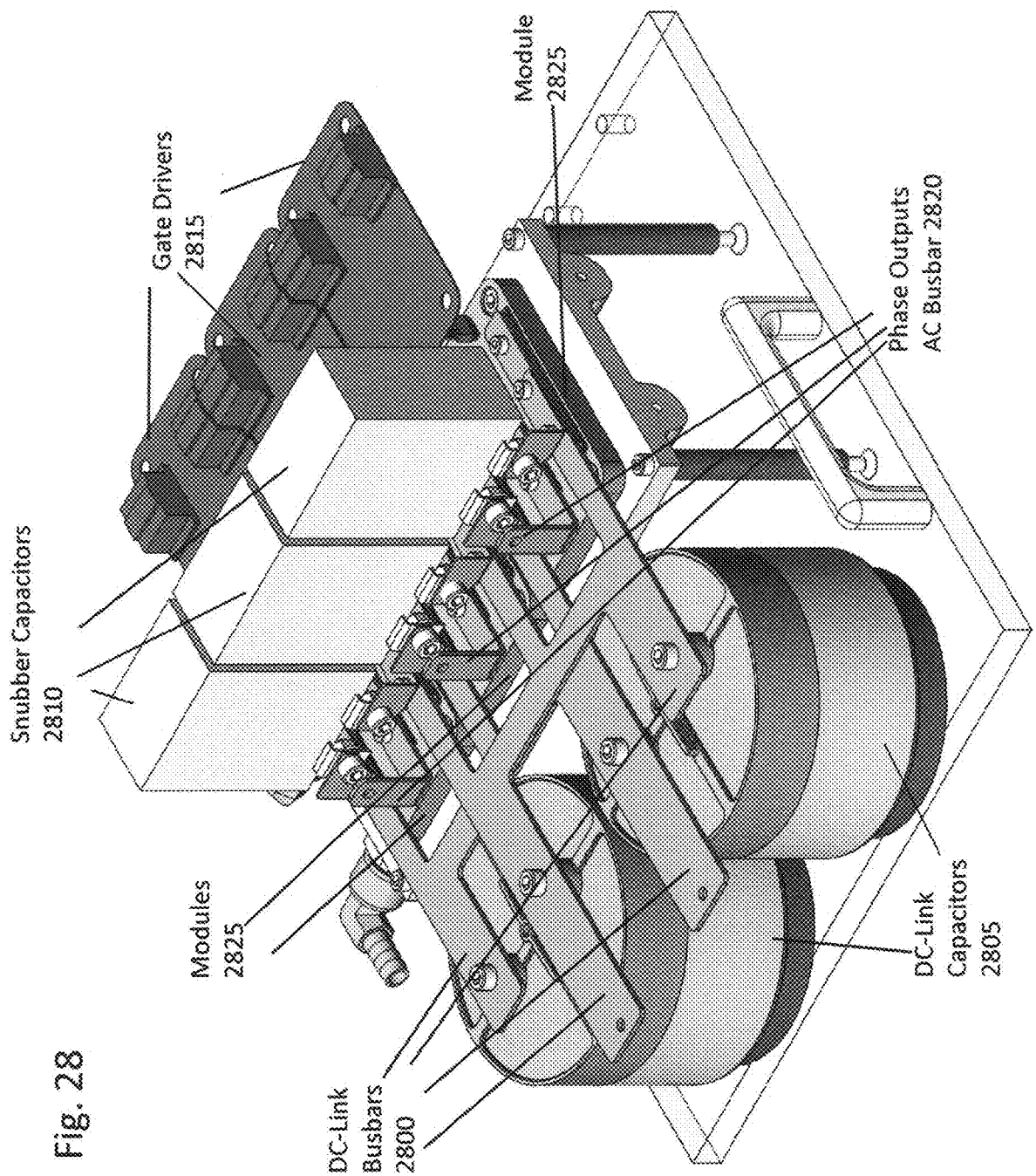
FIG. 28 illustrates a diagram of an inverter used in testing a polyphase wireless power transfer system in accordance with aspects of the disclosure.

FIG. 28 illustrates a system used in testing a coil assembly 25 in accordance with aspects of the disclosure. The design uses three 1200V/325A SiC half-bridge modules 2825 (CAS325M12HM2) (example of inverter 15) and gate drivers 2815 (CGD15HB62LP) from Wolfspeed (example of controller 20). In FIG. 28, the modules 2825 are located below the Phase outputs AC Busbar 2820. Each module 2825 comprises two switching elements, e.g., S1 and S2. Switching elements S7 and S8 were not used in the testing. An identical unit was used as the rectifier by setting the gate signals to turn the MOSFETs (metal-oxide-semiconductor field-effect transistors) off. A recitifer was used in the receiver instead of an inverter as shown in the figures. Two DC-link capacitors (947D601K901DCRSN) 2805 are attached to the DC-link busbars 2800 and one snubber capacitor (SCD305K122C3Z25-F) per module 2810. The modules 2825 was operated in an open-loop fashion from a TMS320F28335 DSP (not shown in FIG. 28). The dead-time was set to 600 ns. The operating frequency was chosen to achieve zero-voltage switching (ZVS) at full load in the aligned configuration. The operating frequency was 88.5 kHz.

A high voltage battery NHR 9300 was used as an input 5. The load was an additional high voltage battery NHR 9300. The load battery was in parallel with a 14 Ohm resistor bank. Oscilloscopes were used to capture waveforms. Specificallty, a Teledyne Lecroy HDO8108 oscilloscope was used to capture the transmitter voltage and current waveforms. A Yokogawa DLM4058 oscilloscope was used to capture the receiver waveforms. The oscilloscopes were operated with independent triggers, resulting in an arbitrary phase shift between the transmitter and receiver plots presented in the following section. A Yokogawa WT1806E power analyzer was used to measure the DC input power, DC output power, and DC-to-DC efficiency of the system.

Figure 30:
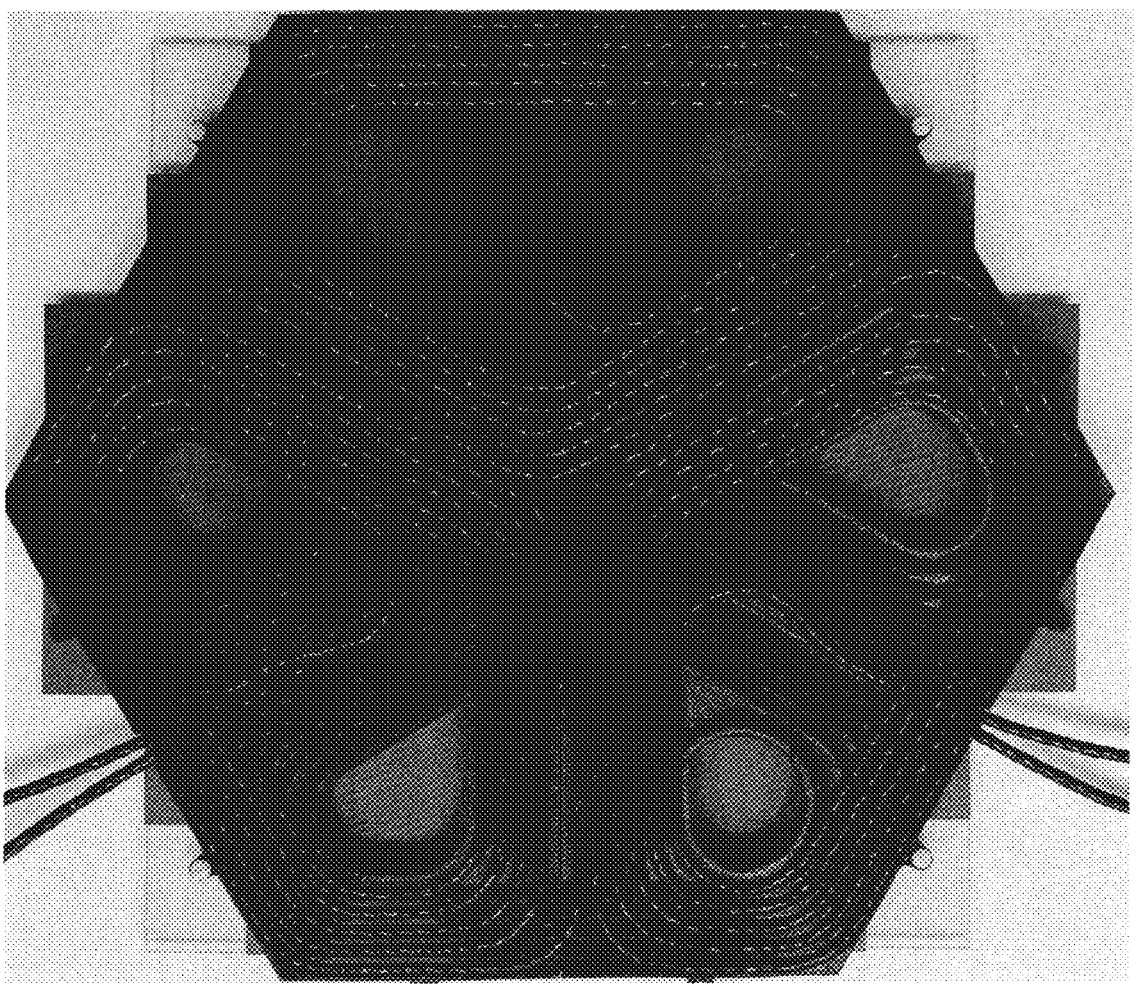
FIG. 30 illustrates a diagram of a double layer coil assembly used in testing a polyphase wireless power transfer system in accordance with aspects of the disclosure.

FIGS. 29A and 29B depict the coil configuration for a double layer coil assembly 25 used in the experiment and FIG. 30 depicts an image of the coil assembly. As depicted, the connections are co-planar with the coils. This enables the assembly to be thinner than if the connections were not co-planar. The double layer coil assembly 25 has a balanced inductance and a larger coil span.

The coil assembly was 47.1 cm×54.4 cm. The total coil mass including ferrite, Litz wire, and wire guides were 13.7 kg. The wire was 6 AWG type 2 litz with a strand gauge of 38 AWG produced by New England Wire. The ferrite 200 was constructed from Ferroxcube PLT64/50/5 tiles of 3C94 material.

The distance between surfaces of the transmitter coil assembly and the receiver coil assembly was 15 cm. This is an expected operating gap for a light duty vehicle. Different application may have between air gaps. For example, an air gap for an heavy duty vehicle may be 30 cm or larger.

The electrical parameters were set to achieve a 50 kW power transfer at the set distance and a phase current of $73 A_{RMS}$. This current corresponds to a current density of 5.5 $A_{RMS}/mm^2$ in 6 AWG wire. The design was limited by the 7.4 mm diameter of the Litz wire and the minimum bend radius, which was set to be five times the diameter. A minimum wall thickness of 1.8 mm for mechanical integrity of the additively manufactured wire guides also limited space for additional amp-turns. The resulting system has a transmiter clearance of 170 mm and a magnetic airgap of 180 mm, e.g., between transmtter coils and receiver coils.

Figure 31C:
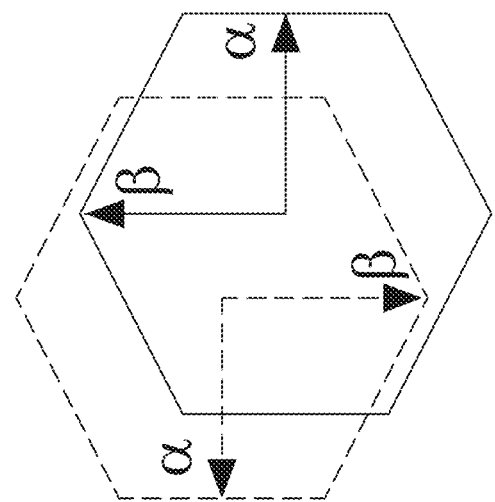
FIGS. 31A-31C illustrate different alignment configurations for the experiment.
Figure 31B:
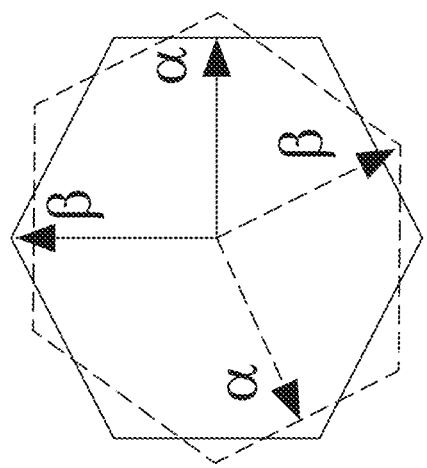
Figure 31A:
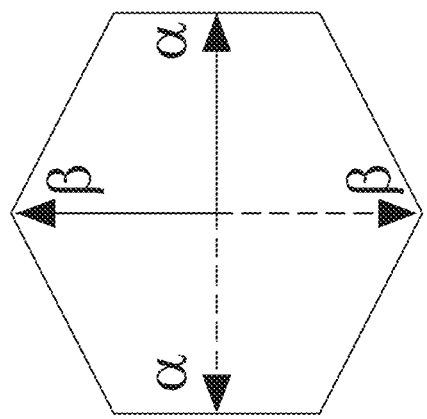

Three alignment conditions of the transmitter coils and the receiver coils were tested: aligned, aligned with a 30° rotation; and offset 10 cm in both x and y directions as shown in FIGS. 31A-C. The receiver coil assembly is shown in the figures by dashes whereas the transmitter coil assembly is shown by a solid line. In FIG. 31C, the receiver coil assembly is translated −10 cm in the x direction and +10 cm in the y direction.

Two resonant network topologies were used: YC-YL and YC-ΔL. The compensating capacitance was determined as described herein using equations 6 or 13. The capacitance values are shown in FIG. 32 for each topology in the experiment.

FIG. 33 illustrates a summary of the experimental results for the YC-YL resonant network topology. As shown in FIG. 33, the aligned and 30 rotation results are nearly identical due to the rotational invariance of the system when the transmitter coil assembly 25 and the receiver coil assembly 125 have the central axes aligned. This is an advantage of a polyphase system over a single phase system. Further, both conditions, aligned and aligned but rotated 30° achieve 50 kW power transfer with greater than 95% DC-to-DC efficiency. In FIG. 33 $V_{dc,g}$ refers to the DC bus voltage of the transmitter and $V_{dc,v}$ refers to the DC load voltage. $P_{g,dc}$ refers to the power at the transmitter and $P_{v,dc}$ refers to power at the receiver. Rdc, v is the load resistance on the receiver side. This resistance servers as the load 140.

FIG. 34 illustrates a summary of the experimental results for the YC-ΔL resonant network topology. As shown in FIG. 34, the aligned and 30° rotation results are nearly identical due to the rotational invariance of the system when the transmitter coil assembly 25 and the receiver coil assembly 125 have the central axes aligned. Further, both conditions, aligned and aligned but rotated 30° achieve 50 kW power transfer with greater than 94% DC-to-DC efficiency. The results for the both conditions are nearly the same.

Compared to a YC-YL resonant network, a YC-ΔL configured system is slightly less efficient. This is because the load impedance required to achieve near-unity voltage gain is about three times less than in the YC-YL case, the inverter and rectifier conduction losses are likely much higher in this configuration. The increase in conduction losses may be partially offset by a decrease in switching losses due to a lower DC-link voltage. However, the reduction in switching losses is limited due to ZVS operation of the inverter during turn-on.

As can be seen in both FIGS. 33 and 34, when the transmitter and receiver coil assembly are misaligned in both the x and y axis, the efficiency is reduced. A −10 cm and 10 cm misalignment represents a worst case scenario. In this configuration, the power transfer capability is limited by the current rating of the coils.

FIG. 35 illustrates simulation results for various coil assembly topologies which demonstrates the benefit of the disclosed polyphase wireless power transfer systems and transmitter such as a three-phase system.

The simulation included a comparative design study of six different matched coil assembly topologies: 1) single phase unipolar 1ψU, 2) single phase bipolar 2ψB, 3) three-phase unipolar with single phase excitation 3ψU(1ψ), 4) three-phase unipolar with three-phase excitation 3ψU, 5) three-phase bipolar with two layers 3ψB (such as FIG. 3A and FIG. 3B), and 6) three-phase bipolar with three layers 3ψB(3 L) (such as FIGS. 4A and 4B). Matching refers to the transmiting and the receiving coils having the same configuration. To focus on the impact of coil layout, a circular geometry for all the coils assemblies with a fixed outer diameter of 47 cm was used. The coil assemblies use two layers of 6 AWG wire except for the three layer three-phase system, which uses 10 AWG. This modification was made in attempt to normalize the upper bound of total Litz wire mass and keep the package thickness similar between systems.

In the field of wireless power transfer for vehicles, the system must meet electromagnetic field emission requirements and safety standards. For example, certain requirements and standards are described by the International Commission on Non-Ionizing Radiation Protection (IC-NIRP) as referenced by SAE's J2954. For instance SAE J2954 also describes various foreign object heating and ignition tests that a system must pass either through the use of a foreign object detection (FOD) systems or by limiting the maximum flux density on the surface of the transmitter coil assembly. In practice, the peak flux density on the surface of the transmitter coil assembly must be limited to meet the touch safety requirements described in SAE J2954.

Safety considerations with respect to emissions and foreign object heating severely limit the maximum power capability of wireless power transfer systems with a given coil assembly size. The design of the system in the stimulation maximizes the power capability while keeping the peak magnetic field occurring at a distance of 80 cm from the center of the system below 21.2 mT, which is the level specified by ICNIRP for pacemaker compatibility. This is accomplished by adjusting 1) the number of turns and 2) the spacing between the turns. The ferrite 200 thickness was adjusted to keep the peak flux-density below 200 mT.

Of the single phase excited systems, the bipolar coil assembly was able to achieve the highest power transfer rate under the emissions constraint. This indicates that the bipolar coil assemblies have better emissions characteristics that unipolar assemblies. The assemblies utilizing three-phase excitation are able to achieve higher power levels for these emissions constraints. The bipolar three-phase assemblies combine the uniform emissions profile of the single phase unipolar assembly with the overall lower emissions characteristics of the single phase bipolar assembly.

The three-phase bipolar assemblies achieve better specific power than the single phase bipolar assembly and approach that of the single-phase unipolar assembly. The 3ψB(3 L) is nearly as good as the 1ψU topology by this metric. The copper mass of the Litz wire tracks the power rating of the coils fairly closely. Most of the difference in specific power between the topologies can be traced to the mass of the ferrites. The improved specific power of the 1ψU, 3ψB, and 3ψB(3 L) couplers can be attributed to the better ferrite utilization of these topologies. In contrast, the 1ψB, 3ψU (1ψ), and 3ψU topologies have prominent regions where the maximum flux density is significantly below the 200 mT limit. As a result, the former topologies must have thicker ferrites for a given power to avoid magnetic saturation.

The bipolar three-phase coil assemblies also have better foreign object heating metrics. The magnetic fields on the surface of the coil assemblies were stimulated. In the stimulation, it was assumed that the surface is 6 cm from the ferrites 200. The parameter examined with $P/B_{max}$. P is the power transfer and $B_{max}$ is the peak flux density on the surface. $B_{max}^2$ is proportional to the amount of eddy-current heating that would occur in a small metallic object placed on the surface at the maximum flux density location. Larger values of this ratio indicate that a given system should be capable of transferring more power before reaching foreign object heating and touch safety limitations.

As shown in FIG. 35, 3ψB topology has the best performance by this metric, with a ratio of 1.000. This topology is followed closely by the 3ψB(3 L) topology at 0.974. These designs exhibits a more uniform surface flux distibution which improves $P/B_{max}$.

The 3ψB(3 L) topology achieved a high specific power density of 8.17 kW kg$^{-1}$. However, since in the three layer design, the wire gauge was decreased to keep the total thickness relatively constant, there was an increase in coil voltage to achieve the same power. In practice, the maximum permissible coil voltage may be limited for safety. If this is the case, using the 3ψB(3 L) topology may require the coil thickness to increase by 50% beyond the 3ψB topology (two layer). This consideration must be weighed against the potential for improving power density and specific power when using the 3ψB(3 L) design.

In accordance with a first aspect, a polyphase inductive power transfer system comprises a transmitter comprising: at least one coil associated with each phase; and compensating capacitance connected in series with the at least one coil for each phase, a value of the compensating capacitance for each phase is determined such that the transmitter has at least two independently excitable resonant modes at a resonant frequency.

In accordance with a second aspect, the system according to the first aspect, wherein the at least two independently excitable resonant modes comprises α-axis and β-axis modes.

In accordance with a third aspect, the system according to the first aspect or the second aspect, wherein the value of the compensating capacitance is based on a topology of the compensating capacitance and the at least one coil for the phases and mutual inductance between the at least one coil for each of the phases.

In accordance with a fourth aspect, the system according to the first aspect, the second aspect or the third aspect, wherein the topology is selected from a group consisting of a series delta-capacitance-delta inductance, a series wye-capacitance-delta inductance, a series delta-capacitance-wye inductance and a series wye-capacitance-wye inductance.

In accordance with a fifth aspect, the system according to the first aspect, the second aspect or the third aspect, wherein the transmitter further comprises a compensating network, the compensating network having an LCC configuration, wherein the compensating capacitance is incorporated in the compensating network.

In accordance with a sixth aspect, the system according to any one of the first to fifth aspects, wherein the transmitter comprising two coils for each phase, the two coils have an opposite polarity.

In accordance with a seventh aspect, the system according to any one of the first to sixth aspects, wherein the transmitter further comprises a coil assembly, the coil assembly comprising multiple layers stacked on a ferrite.

In accordance with an eighth aspect, the system according to the seventh aspect, wherein coils having the same polarity are one layer and coils having an opposite polarity are a second layer.

In accordance with a ninth aspect, the system according to the seventh or eighth aspect, wherein connections to the compensating capacitance are co-planar with the coils.

In accordance with a tenth aspect, the system according to the seventh aspect, wherein coils for different phases are different layers.

In accordance with an eleventh aspect, the system according to the any one of the seventh to tenth aspects, wherein the coil assembly comprises a wireguide, where the coils are positioned in the wireguide.

In accordance with a twelfth aspect, the system according to the any one of the seventh to eleventh aspects, the coils in each layer are secured in place using thermal epoxy.

In accordance with a thirteenth aspect, the system according to the twelfth aspect, wherein the coil assembly further comprises a housing and wherein the ferrite and multiple layers are disposed within the housing.

In accordance with a fourteenth aspect, the system according to any one of first to thirteenth aspects, further comprising a receiver comprising: at least one coil associated with each phase; and compensating capacitance connected in series with the at least one coil for each phase, a value of the compensating capacitance for each phase is determined such that the receiver has at least two independently excitable resonant modes at a resonant frequency.

In accordance with a fifteenth aspect, a bipolar polyphase coil assembly comprising: a ferrite; and two coils for each of the polyphases, the two coils having an opposite polarity, wherein all coils are a single layer, the coils for different phases being interleaved and coils of opposite polarity are on opposite sides of the layer, and a distance between each coil and the ferrite is the same.

In accordance with a sixteenth aspect, the assembly according to the fifteenth aspect, wherein there are three-phases of coils and each coil spans 60° of the single layer.

In accordance with a seventeenth aspect, the assembly according to the fifteenth aspect or the sixteenth aspect, wherein connections to a compensation network are co-planar with the coils.

In accordance with an eighteenth aspect, a multi-layer bipolar polyphase coil assembly comprising: a ferrite; and two coils for each of the polyphases, the two coils having an opposite polarity, wherein the two coils for the same phase of the polyphases are the same layer, and the distance between the ferrite and each layer is different.

In accordance with a nineteenth aspect, the assembly according to the eighteenth aspect, wherein connections to a compensation network are co-planar with a respective layer.

In accordance with a twentieth aspect, the assembly according to the eighteenth aspect or nineteenth aspect, wherein there are three-phases and each coil spans 180° of a respective layer.

In accordance with a twenty-first aspect, a double layer bipolar polyphase coil assembly comprising: a ferrite; and two coils for each of the polyphases, the two coils having an opposite polarity, wherein the two coils for the same phase of the polyphases are different layers of the double layer, coils for the same phase that have opposite polarity are not aligned in a stacked direction, and the distance between the ferrite and each layer is different, wherein connections to a compensation network are co-planar with a respective layer.

In accordance with a twenty-second aspect, an assembly according to the twenty-first aspect, wherein there are three-phases and each coil spans 120° of a respective layer.

In accordance with a twenty-third aspect, an assembly according to the twenty-first aspect or the twenty-second aspect, wherein the ferrite is formed by ferrite tiles.

In accordance with a twenty-fourth aspect, an assembly according to the twenty-first aspect, the twenty-second aspect or twenty-third aspect, wherein the coils are positioned in a wireguide.

In accordance with a twenty-fifth aspect, an assembly according to any one of twenty-first to the twenty-fourth aspects, wherein there is a balanced mutual inductance between coils of different phases.

In accordance with a twenty-sixth aspect, an assembly according to any one of twenty-first to the twenty-fifth aspects, wherein there is a balanced self inductance of the coils of the different phases.

In accordance with a twenty-seventh aspect, a polyphase wireless power transfer system comprising: a transmitter comprising: at least one coil associated with each phase; a compensating network connected with the at least one coil for each phase; an inverter comprising a plurality of switching pairs, each of the plurality of switching pairs respectively electrically coupled to the compensating network and the at least one coil for a respective phase; and a controller electrically coupled to each of the plurality of switching pairs to selectively turn OFF or ON a respective switch, wherein a timing in which each of the switching pairs is turned OFF or ON is based on a type of receiver being inductively coupled to the transmitter.

In accordance with a twenty-eighth aspect, a system according to the twenty-seventh aspect, wherein the at least one coil is one coil and wherein the inverter further comprising another switching pair, the another switching pair is electrically coupled to a neutral of the one coil for each phase, the controller is further electrically coupled to the another switching pair to selectively turn OFF or ON a respective switch, wherein the control of the another switching pair based on a type of receiver being inductively coupled to the transmitter.

In accordance with a twenty-ninth aspect, a system according to the twenty-eighth aspect, wherein the type of receiver is selected from a group consisting of a three-phase receiver, a single phase receiver having a circular receiving coil and a single phase receiver having a DD type receiving coils.

In accordance with a thirtieth aspect, a system according to the twenty-ninth aspect, wherein when the type of receiver is the three-phase receiver, the controller is configured to maintain the another switching pair OFF or turn the another switching pair OFF and control the switching of three switching pairs of the plurality of switching pairs at a different timing.

In accordance with a thirty-first aspect, a system according to the twenty-ninth aspect or the thirtieth aspect, wherein when the type of receiver is the single phase receiver having the DD type receiving coils, the controller is configured to maintain the another switching pair OFF or turn the another switching pair OFF and control the switching of two switching pairs of the plurality of switching pairs at the same time when rotationally aligned and a third switching pair of the plurality of switching pairs at a different timing.

In accordance with a thirty-second aspect, a system according to the twenty-ninth aspect, the thirtieth aspect, or thirty-first aspect, wherein when the type of receiver is the single phase receiver having the circular receiving coil, the controller is configured to control the switching of three switching pairs of the plurality of switching pairs corresponding to three-phases at the same time when aligned and control the another switching pair to turn ON and OFF.

In accordance with a thirty-third aspect, a system according to the thirty-second aspect, wherein the controller is configured to control the another switching pair to vary a duty cycle of the three-phases when the type of receiver is the single phase receiver having the circular receiving coil.

In accordance with a thirty-fourth aspect, a system according to the twenty-seventh aspect, wherein the transmitter comprises two coils for each phase, the two coils having an opposite polarity, and wherein the type of receiver is selected from a group consisting of a three-phase receiver and a single phase receiver having a DD type receiving coils.

In accordance with a thirty-fifth aspect, a system according to the thirty-fourth aspect, wherein when the type of receiver is the single phase receiver having the DD type receiving coils, the controller is configured to control the switching of two switching pairs of the plurality of switching pairs at the same time when rotational aligned and a third switching pair of the plurality of switching pairs at a different timing.

In accordance with a thirty-sixth aspect, a system according to the thirty-fourth aspect or the thirty-fifth aspect, wherein when the type of receiver is the three-phase receiver, the controller is configured to control the switching of three switching pairs of the plurality of switching pairs at a different timing.

In accordance with a thirty-seventh aspect, a system according to the twenty-seventh aspect, wherein the transmitter comprises two coils for each phase, the two coils having an opposite polarity, wherein the plurality of switching pairs comprises a plurality of first switching pairs and plurality of second switching pairs, where the first switching pairs and the second switching pairs are electrical coupled to coils of different polarity, respectively, wherein the inverter further comprising two other switching pairs, one switching pair of the other switching pairs is electrically coupled to neutral of coils of a first polarity for each phase and the second switching pair of the other switching pairs is electrically coupled to the neutral of coils of the opposite polarity.

In accordance with a thirty-eighth aspect, a system according to the thirty-seventh aspect, wherein the type of receiver is selected from a group consisting of a three-phase receiver, a single phase receiver having a circular receiving coil and a single phase receiver having a DD type receiving coils.

In accordance with a thirty-ninth aspect, a system according to the thirty-eighth aspect, wherein when the type of receiver is the three-phase receiver, the controller is configured to maintain the each of the two other switching pairs OFF or turn each of the two other switching pairs OFF and control the switching of the plurality of first switching pairs and the plurality of second switching pairs such that switching pairs coupled to coils of opposite polarities of the same phase are controlled at the same time and switching pairs coupled to coils of different phases are controlled at different times.

In accordance with a fortieth aspect, a system according to the thirty-eighth aspect or thirty-ninth aspect, wherein when the type of receiver is the single phase receiver having the DD type receiving coils, the controller is configured to maintain the two other switching pairs OFF or turn the two other switching pairs OFF and control the switching of the plurality of first switching pairs and the plurality of second switching pairs such that switching pairs coupled to coils of opposite polarities of the same phase are controlled at the same time and switching pairs coupled to two phases of the three-phases are controlled simultaneously when rotationally aligned and switching pairs coupled to a third phase are controlled at a different time.

In accordance with a forty-first aspect, a system according to the thirty-eighth aspect, the thirty-ninth aspect or fortieth aspect, wherein when the type of receiver is the single phase receiver having the circular receiving coil, the controller is configured to control the switching of the plurality of the first switching pairs and the plurality of second switching pairs such that the switching pairs coupled to coils of the three-phases are controlled at the same time when aligned and control the two other switching pairs to turn ON and OFF.

In accordance with a forty-second aspect, a system according to the forty-first aspect, wherein the controller is configured to control the two other switching pairs to vary a duty cycle of the three-phases when the type of receiver is the single phase receiver having the circular receiving coil.

In accordance with a forty-third aspect, a system according to any one of the first to fourteenth aspects, wherein the at least two independently excitable resonant modes are orthogonal.

In accordance with a forty-fourth aspect, a system according to any one of the twenty-seventh to forty-second aspects, wherein the transmitter further comprises a wireless interface, and wherein when the transmitter receives the type of receiver via the wireless interface from the receiver, wherein the controller controls the timing based on the received type of receiver.

In accordance with a forty-fifth aspect, a system according to any one of the twenty-seventh to forty-second aspects, wherein the controller is configured to detect the type of receiver.

In accordance with a forty-sixth aspect, a system according to the forty-fifth aspect, further comprising a memory configured to store electrical properties associated with the types of receiver, wherein the controller is configured to control the switching pairs to sequentially excite a plurality of excitable resonant modes for a set time, and receive sensed electrical properties and compare the sensed electrical properties with the stored electrical properties to detect the type of receiver.

In accordance with a forty-seventh aspect, a system according to the forty-sixth aspect, wherein the controller controls the timing based on the detected type of receiver.

In accordance with a forty-eighth aspect, a system according to any one of the twenty-seventh to forty-second aspects or the forty-fourth to forty-seventh aspects, further comprising a camera configured to detect an alignment condition of the at least one coil associated with each phase in the transmitter and at least one coil in the receiver.

In accordance with a forty-ninth aspect, a system according to the forty-eighth aspect, wherein the controller is configured to control the timing based on the detected alignment condition by the camera.

In accordance with a fiftieth aspect, a system according to the forty-eighth aspect or forty-ninth, wherein the detected alignment conditional comprises at least one of a translational and rotational alignment.

In accordance with a fifty-first aspect, a system according to any one of the twenty-seventh to forty-second aspects or the forty-fourth to forty-seventh aspects, wherein the controller is configured to detect an alignment condition of the at least one coil associated with each phase in the transmitter and at least one coil in the receiver.

In accordance with a fifty-second aspect, a system according to the fifty-first aspect, further comprising a memory configured to store electrical properties associated with the a plurality of translational and rotational alignment conditions for each type of receiver and wherein the controller is configured to control the switching pairs to sequentially excite a plurality of excitable resonant modes for a set time, and receive sensed electrical properties and compare the sensed electrical properties with the stored electrical properties to detect the alignment condition.

In accordance with a fifty-third aspect, a system according to the fifty-second aspect, wherein the controller is configured to control the timing based on the detected alignment condition.

In accordance with a fifty-fourth aspect, a system according to the forty-fourth aspect, wherein when the transmitter receives an alignment condition of the at least one coil associated with each phase in the transmitter and at least one coil in the receiver via the wireless interface from the receiver, wherein the controller controls the timing based on the received alignment condition.

Various aspects of the present disclosure may be embodied as a program, software, or computer instructions embodied or stored in a computer or machine usable or readable medium, or a group of media which causes the computer or machine to perform the steps of the method when executed on the computer, controller, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The term "Controller" as may be used in the present disclosure may include a variety of combinations of fixed and/or portable computer hardware, software, peripherals, and storage devices. The "Controller" may include a plurality of individual components that are networked or otherwise linked to perform collaboratively or may include one or more stand-alone components. The hardware and software components of the "Controller" of the present disclosure may include and may be included within fixed and portable devices such as desktop, laptop, and/or server, and network of servers (cloud).

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A polyphase wireless power transfer system comprising:
   a transmitter comprising:
      at least one coil associated with each phase;
      a compensating network connected with the at least one coil for each phase;
      an inverter comprising a plurality of switching pairs, each of the plurality of switching pairs respectively electrically coupled to the compensating network and the at least one coil for a respective phase; and
      a controller electrically coupled to each of the plurality of switching pairs to selectively turn OFF or ON a respective switch, wherein a timing in which each of the switching pairs is turned OFF or ON is based on a type of receiver being inductively coupled to the transmitter.

2. The polyphase wireless power transfer system of claim 1, wherein the at least one coil is one coil and wherein the inverter further comprising another switching pair, the another switching pair is electrically coupled to a neutral of the one coil for each phase, the controller is further electrically coupled to the another switching pair to selectively turn OFF or ON a respective switch, wherein the control of the another switching pair based on a type of receiver being inductively coupled to the transmitter.

3. The polyphase wireless power transfer system of claim 2, wherein the type of receiver is selected from a group consisting of a three-phase receiver, a single phase receiver having a circular receiving coil and a single phase receiver having a DD type receiving coils.

4. The polyphase wireless power transfer system of claim 3, wherein when the type of receiver is the three-phase receiver, the controller is configured to maintain the another switching pair OFF or turn the another switching pair OFF and control the switching of three switching pairs of the plurality of switching pairs at a different timing.

5. The polyphase wireless power transfer system of claim 3, wherein when the type of receiver is the single phase receiver having the DD type receiving coils, the controller is configured to maintain the another switching pair OFF or turn the another switching pair OFF and control the switching of two switching pairs of the plurality of switching pairs at the same time when rotationally aligned and a third switching pair of the plurality of switching pairs at a different timing.

6. The polyphase wireless power transfer system of claim 3, wherein when the type of receiver is the single phase receiver having the circular receiving coil, the controller is configured to control the switching of three switching pairs of the plurality of switching pairs corresponding to three-phases at the same time when aligned and control the another switching pair to turn ON and OFF.

7. The polyphase wireless power transfer system of claim 6, wherein the controller is configured to control the another switching pair to vary a duty cycle of the three-phases when the type of receiver is the single phase receiver having the circular receiving coil.

8. The polyphase wireless power transfer system of claim 1, wherein the transmitter comprises two coils for each phase, the two coils having an opposite polarity, and wherein the type of receiver is selected from a group consisting of a three-phase receiver and a single phase receiver having a DD type receiving coils.

9. The polyphase wireless power transfer system of claim 8, wherein when the type of receiver is the single phase receiver having the DD type receiving coils, the controller is configured to control the switching of two switching pairs of the plurality of switching pairs at the same time when rotational aligned and a third switching pair of the plurality of switching pairs at a different timing.

10. The polyphase wireless power transfer system of claim 8, wherein when the type of receiver is the three-phase receiver, the controller is configured to control the switching of three switching pairs of the plurality of switching pairs at a different timing.

11. The polyphase wireless power transfer system of claim 1, wherein the transmitter comprises two coils for each phase, the two coils having an opposite polarity, wherein the plurality of switching pairs comprises a plurality of first switching pairs and plurality of second switching pairs, where the first switching pairs and the second switching pairs are electrical coupled to coils of different polarity, respectively, wherein the inverter further comprising two other switching pairs, one switching pair of the other switching pairs is electrically coupled to neutral of coils of a first polarity for each phase and the second switching pair of the other switching pairs is electrically coupled to the neutral of coils of the opposite polarity.

12. The polyphase wireless power transfer system of claim 11, wherein the type of receiver is selected from a group consisting of a three-phase receiver, a single phase receiver having a circular receiving coil and a single phase receiver having a DD type receiving coils.

13. The polyphase wireless power transfer system of claim 12, wherein when the type of receiver is the three-phase receiver, the controller is configured to maintain the each of the two other switching pairs OFF or turn each of the two other switching pairs OFF and control the switching of the plurality of first switching pairs and the plurality of second switching pairs such that switching pairs coupled to coils of opposite polarities of the same phase are controlled at the same time and switching pairs coupled to coils of different phases are controlled at different times.

14. The polyphase wireless power transfer system of claim 12, wherein when the type of receiver is the single phase receiver having the DD type receiving coils, the controller is configured to maintain the two other switching pairs OFF or turn the two other switching pairs OFF and control the switching of the plurality of first switching pairs and the plurality of second switching pairs such that switching pairs coupled to coils of opposite polarities of the same phase are controlled at the same time and switching pairs coupled to two phases of the three-phases are controlled simultaneously when rotationally aligned and switching pairs coupled to a third phase are controlled at a different time.

15. The polyphase wireless power transfer system of claim 12, wherein when the type of receiver is the single phase receiver having the circular receiving coil, the controller is configured to control the switching of the plurality of the first switching pairs and the plurality of second switching pairs such that the switching pairs coupled to coils of the three-phases are controlled at the same time when aligned and control the two other switching pairs to turn ON and OFF.

16. The polyphase wireless power transfer system of claim 15, wherein the controller is configured to control the two other switching pairs to vary a duty cycle of the three-phases when the type of receiver is the single phase receiver having the circular receiving coil.

17. The polyphase wireless power transfer system of claim 1, wherein the transmitter further comprises a wireless interface, and wherein when the transmitter receives the type of receiver via the wireless interface from the receiver, wherein the controller controls the timing based on the received type of receiver.

18. The polyphase wireless power transfer system of claim 17, wherein when the transmitter receives an alignment condition of the at least one coil associated with each phase in the transmitter and at least one coil in the receiver via the wireless interface from the receiver, wherein the controller controls the timing based on the received alignment condition.

19. The polyphase wireless power transfer system of claim 1, wherein the controller is configured to detect the type of receiver.

20. The polyphase wireless power transfer system of claim 19, further comprising a memory configured to store electrical properties associated with the types of receiver, wherein the controller is configured to control the switching pairs to sequentially excite a plurality of excitable resonant modes for a set time, and receive sensed electrical properties and compare the sensed electrical properties with the stored electrical properties to detect the type of receiver.

21. The polyphase wireless power transfer system of claim 20, wherein the controller controls the timing based on the detected type of receiver.

22. The polyphase wireless power transfer system of claim 1, further comprising a camera configured to detect an alignment condition of the at least one coil associated with each phase in the transmitter and at least one coil in the receiver.

23. The polyphase wireless power transfer system of claim 22, wherein the controller is configured to control the timing based on the detected alignment condition by the camera.

24. The polyphase wireless power transfer system of claim 22, wherein the detected alignment conditional comprises at least one of a translational and rotational alignment.

25. The polyphase wireless power transfer system of claim 1, wherein the controller is configured to detect an alignment condition of the at least one coil associated with each phase in the transmitter and at least one coil in the receiver.

26. The polyphase wireless power transfer system of claim 25, further comprising a memory configured to store electrical properties associated with the a plurality of translational and rotational alignment conditions for each type of receiver and wherein the controller is configured to control the switching pairs to sequentially excite a plurality of excitable resonant modes for a set time, and receive sensed electrical properties and compare the sensed electrical properties with the stored electrical properties to detect the alignment condition.

27. The polyphase wireless power transfer system of claim 26, wherein the controller is configured to control the timing based on the detected alignment condition.

* * * * *